(12) United States Patent
Lim

(10) Patent No.: US 12,455,067 B1
(45) Date of Patent: Oct. 28, 2025

(54) UNDERWATER VIDEO LIGHT SYSTEM

(71) Applicant: SUBNOX International Limited, Wanchai (HK)

(72) Inventor: Kay Burn Lim, Rivervale (AU)

(73) Assignee: SUBNOX International Limited, Wanchai (HK)

( * ) Notice: Subject to any disclaimer, the term of this patent is extended or adjusted under 35 U.S.C. 154(b) by 0 days.

(21) Appl. No.: 18/963,440

(22) Filed: Nov. 27, 2024

Related U.S. Application Data

(63) Continuation-in-part of application No. 18/647,490, filed on Apr. 26, 2024.

(51) Int. Cl.
| | |
|---|---|
| *F21V 23/00* | (2015.01) |
| *F21V 3/00* | (2015.01) |
| *F21Y 113/13* | (2016.01) |
| *F21Y 115/10* | (2016.01) |
| *H04N 23/74* | (2023.01) |

(52) U.S. Cl.
CPC .............. *F21V 23/003* (2013.01); *F21V 3/00* (2013.01); *F21Y 2113/13* (2016.08); *F21Y 2115/10* (2016.08); *H04N 23/74* (2023.01)

(58) Field of Classification Search
CPC ................................ F21V 23/003; F21V 3/00
See application file for complete search history.

(56) References Cited

U.S. PATENT DOCUMENTS

| | | | |
|---|---|---|---|
| 9,453,635 B1* | 9/2016 | Fuller | F21V 3/00 |
| 10,237,951 B1* | 3/2019 | Quilici | F21V 7/0016 |
| 12,173,884 B2* | 12/2024 | Baldwin | F21V 5/007 |
| 2014/0070724 A1* | 3/2014 | Gould | F21V 7/0016 |
| | | | 362/231 |
| 2014/0160719 A1* | 6/2014 | Van Boven | F21V 14/02 |
| | | | 362/1 |
| 2015/0062892 A1* | 3/2015 | Krames | H05B 47/16 |
| | | | 362/231 |
| 2023/0105448 A1* | 4/2023 | Christensen | F21V 23/003 |
| | | | 315/294 |

* cited by examiner

*Primary Examiner* — Bryon T Gyllstrom
(74) *Attorney, Agent, or Firm* — Edmond DeFrank

(57) ABSTRACT

The embodiments disclose an underwater video light system including a chip-on-board LED light configured to project multiple-colored LED light arrays in an underwater environment from a chip-on-board LED module, at least one colored LED light array from a group consisting of a blue light LED array, bluish green light LED array, and green light LED array, a wide-angle coupled to the chip-on-board LED light configured to project the chip-on-board LED light in a wide angle illumination in the underwater environment, at least one digital processor controller coupled to the chip-on-board LED light configured to regulate power transmission to the chip-on-board LED light module, a rechargeable battery pack, and an LED display coupled to the chip-on-board LED light configured to display operating settings and color selections.

20 Claims, 20 Drawing Sheets

UNDERWATER VIDEO LIGHT SYSTEM

CROSS-REFERENCE TO RELATED APPLICATIONS

This patent application is a Continuation-in-part and claims priority to the United States patent application entitled: "UNDERWATER VIDEO LIGHT SYSTEM", U.S. Ser. No. 18/647,490 filed on Apr. 26, 2024 by Kay Burn Lim, the U.S. Patent Applications being incorporated herein by reference.

BACKGROUND

A problem faced by underwater videographers is that water acts as a filter and the deeper the dive, the more colors are filtered out from the color spectrum starting from red colors and through to violet. At 5-6m or so, the color red starts to fade out in the images. At 10m oranges and yellows start to fade. This is why a lot of amateur underwater video clips look very bluish-green, depending on the location of the waters where the dive is taking place. Underwater cinematographers bring video lights underwater to not only illuminate the subjects but also to give color to subjects at depth. Video lights underwater can help by bringing that light source to depth. Almost all video lights are approximately 5600K in color temperature, mimicking daylight. However, there are limitations to what this can do.

The effect is only useful as far as the light can reach and the camera white balance should be set to film as on land to match the 5600K output by the video lights. Anything the light does not touch remains extremely blue when filmed in blue water and does not match what the light touches. Video lights have a very limited reach in water and light intensity drops exponentially the further the subject is from the lights as compared to the reach on land.

However, many cameras these days can white-balance the surrounding bluish or greenish-blue water and are somewhat effective without a torch. It is a function available even on compact cameras.

In addition to this, many cameras or underwater camera housings offer red filters to help bring reds and tints of yellow back into the image recorded for a more natural look. Magenta filters are also used in green water for a more natural look. Using these methods, however, poses a direct conflict with using video lights as everything the video lights illuminate will end up looking far too red, because of the red filter or because the camera's white balance injects red to compensate.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of an underwater video light system, are described for illustrative purposes and the underlying system can apply to any number and multiple types of underwater video cameras. In one embodiment of the present invention, the underwater video light system can be configured using multiple color chip-on-board LED lights, combining these colors to produce a specific color temperature and tint to match the ambient water color temperature. In another embodiment, the underwater video light system can also be configured to include chip-on-board LED lights with the various desired preset ambient water color temperatures to achieve the same result without color mixing using the present invention.

Figure 1:
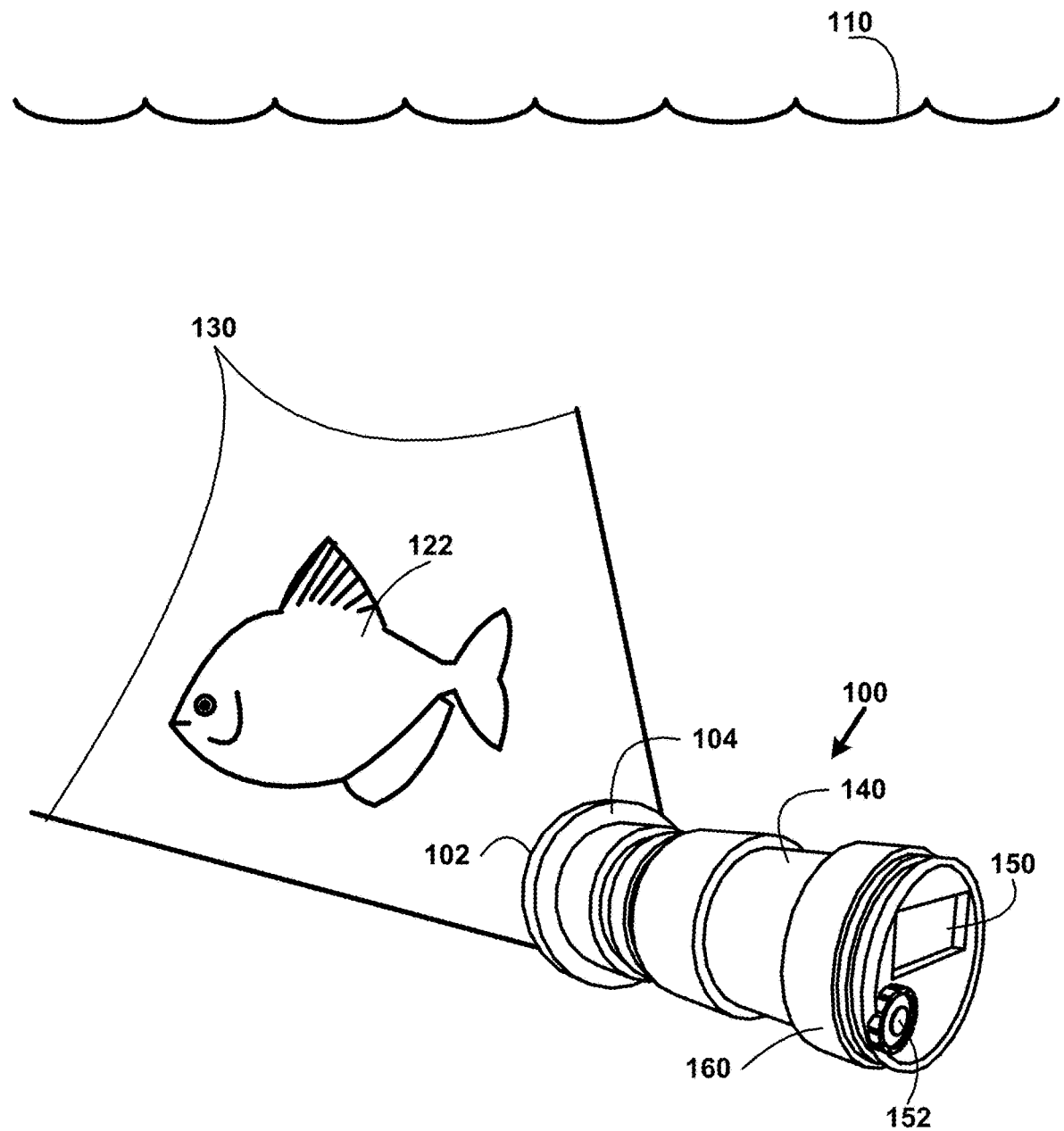
FIG. 1 shows for illustrative purposes only an example of illuminating the underwater environment of one embodiment.

FIG. 1 shows for illustrative purposes only an example of illuminating the underwater environment of one embodiment. FIG. 1 shows the ocean water surface 110. Below the surface is a wide-angle video underwater lighting 100 device to provide underwater lighting solutions for illumination and filming in aquatic environments 130. The wide-angle video underwater lighting 100 device illuminates marine life 122 and environmental features for filming at various depths. The wide-angle video underwater lighting 100 device is powered by a rechargeable battery pack that lasts at full power for the duration of an entire dive 140.

A chip-on-board LED multi-color array 102 included in the wide-angle video underwater light 100 allows a videographer to switch color arrays of the chip-on-board LED multi-color array 102 based on depth and ambient water color. The preset custom colored LED arrays are based on depth and ambient water colors. At least one preset colored LED light array is paired with a daylight white cob that is 5600k, wherein a daylight color, shallow water color, deeper water color are all in one chip-on-board. The multiple LED preset arrays cover all depths and mimics various water colors at the depths. The selector dial displays the color and depth in the LED display 150 of the wide-angle video underwater lighting 100.

The wide angle 104 provides a large area of illumination to capture the underwater environment. A digital processor controller 160 to adjust the power level to the chip-on-board LED. A rear mounted magnetic power control ring 152 can be adjusted to change the level of power to increase or decrease the brightness of the illumination. The videographer can view the display screen 150 at the rear of the wide-angle video underwater lighting 100 device to review the power level and battery pack charge level.

These advanced underwater lighting products are configured for videographers and the general scuba diving community. The products enhance the quality of underwater cinematography by providing reliable and innovative lighting solutions that cater to the unique challenges of illumination and filming in aquatic environments. High-performance underwater lights that are easy to operate and tailored for both amateur and professional filmmakers. The products are configured to address common issues faced during underwater filming and other illumination requirements. The illumination devices enhance both usability and functionality. The torches and video lights includes/wide angle video lights with multiple chip-on-board LEDs for daylight and ambient water colors lighting solutions.

Figure 2:
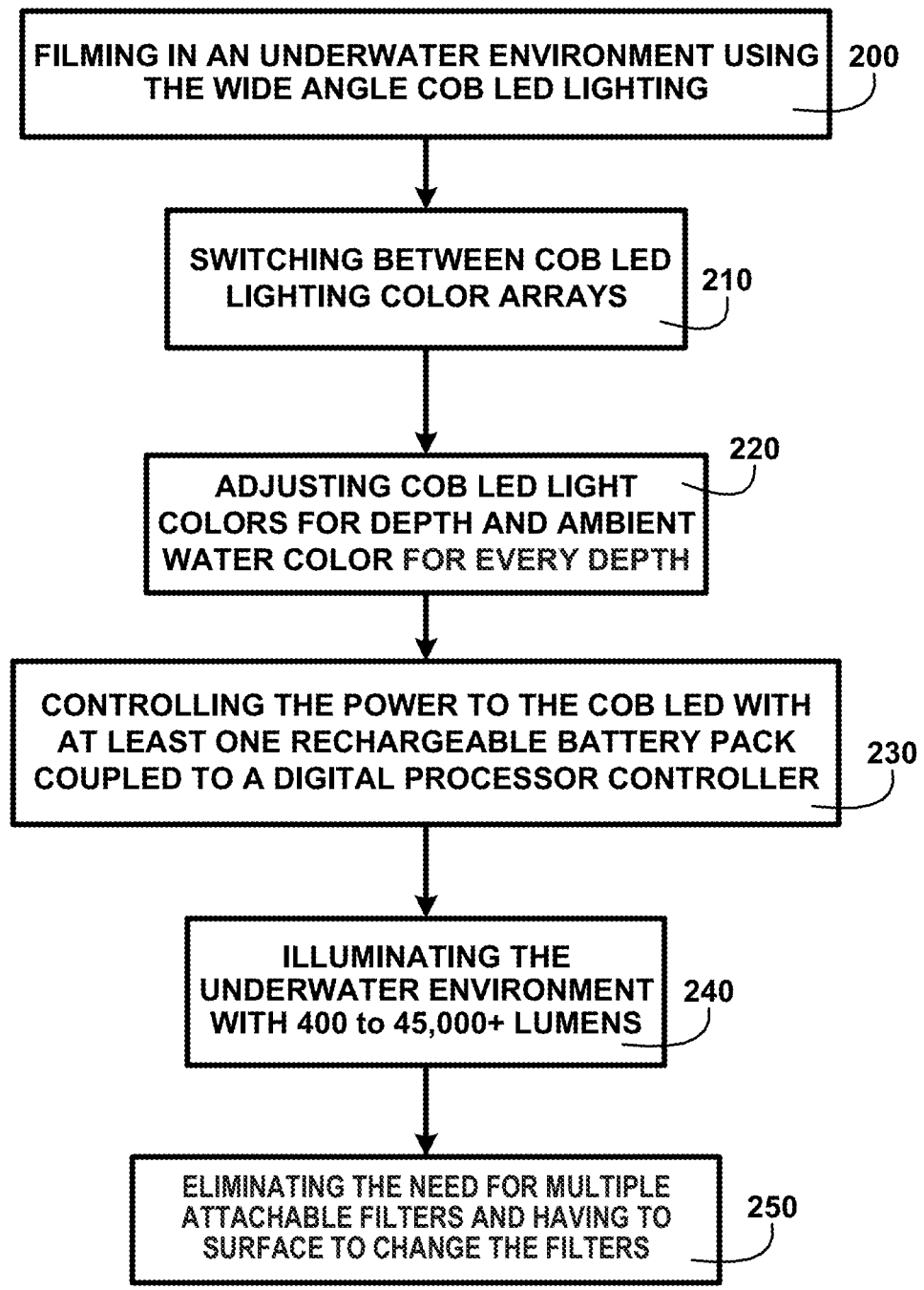
FIG. 2 shows for illustrative purposes only an example of selecting preset chip-on-board LED light colors based on depth and ambient water colors of one embodiment.

FIG. 2 shows for illustrative purposes only an example of selecting preset chip-on-board LED light colors for depth and ambient water color of one embodiment. FIG. 2 shows filming in an underwater environment using the wide-angle chip-on-board LED lighting 200. Switching between chip-on-board LED color arrays 210. Adjusting chip-on-board LED light colors for depth and ambient water color for every depth 220 provides consistent colors of the marine life and underwater environment to be captured when the subject traverses from a distance and into the reach of the ambient water color LED light. Controlling the power to the chip-on-board LED with at least one rechargeable battery pack coupled to a digital processor controller 230 further enables the capture of natural looking colors without color shifts when the subject traverses between ambient light and light emitted by the chip-on-board.

Illuminating the underwater environment with 400 to 45,000+ Lumens 240 provides a range of illumination to fit changing underwater conditions. Adjusting chip-on-board LED light colors for depth and ambient water color for every depth 220 benefits the videographer by eliminating the need for multiple attachable filters and having to surface to change the filters 250 of one embodiment.

Figure 3:
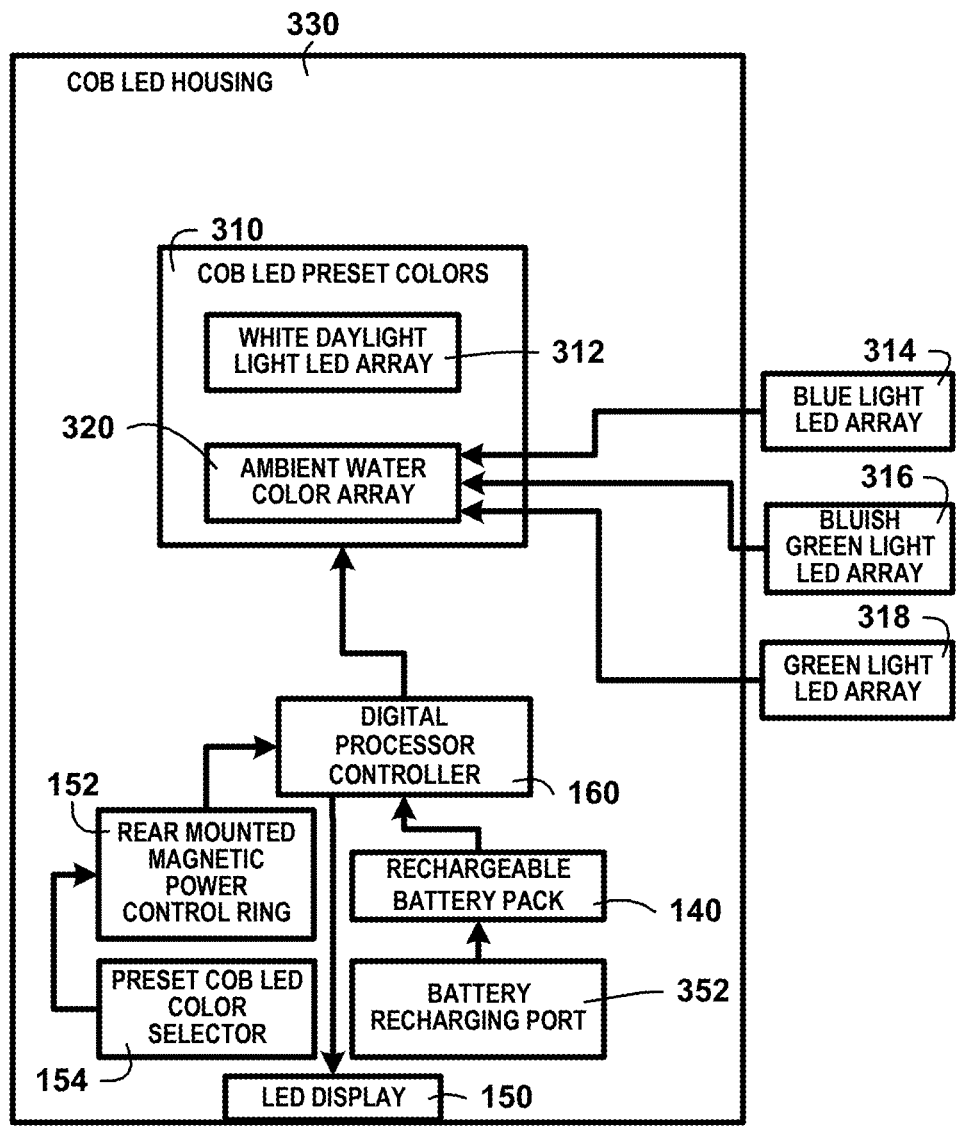
FIG. 3 shows for illustrative purposes only an example of a chip-on-board LED housing of one embodiment.

FIG. 3 shows for illustrative purposes only an example of a chip-on-board LED housing of one embodiment. FIG. 3 shows a chip-on-board LED housing 330 having a plain clear glass or glass dome over the chip-on-board 104 and chip-on-board LED preset colors 310. The chip-on-board LED 310 includes white daylight light led array 312 and various ambient water color arrays 320. The ambient water color array 320 includes at least one of the groups consisting of a blue light led array 314, bluish green light led array 316, and green light led array 318.

A digital processor controller 160 of the chip-on-board LED housing 330 allows the videographer to adjust power settings with a rear mounted magnetic power control ring 152. An LED display 150 shows the power level, battery pack charge level, and other information. The rechargeable battery pack 140 is removeable and can be replaced with a fully charged battery and using the battery recharging port 352 recharged.

Figure 4:
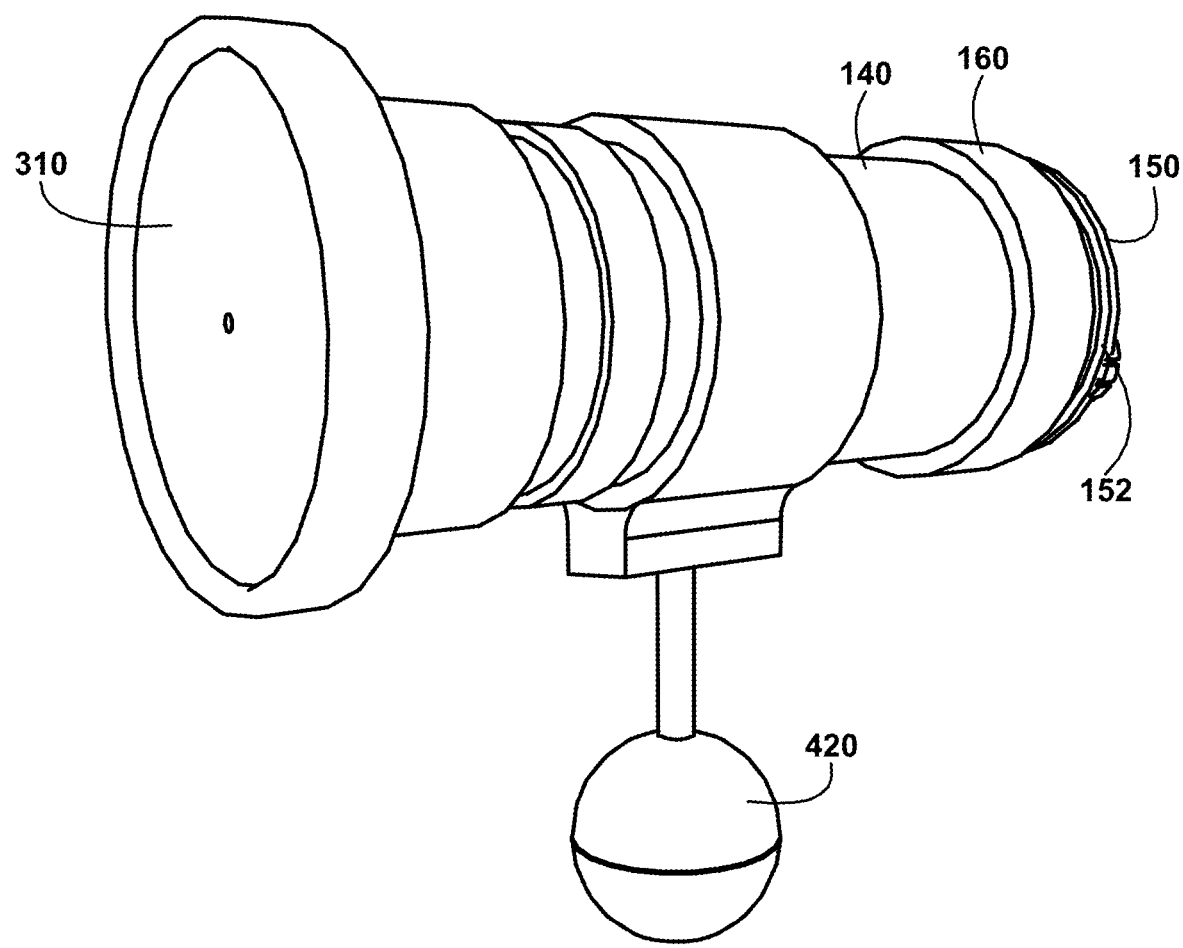
FIG. 4 shows for illustrative purposes only an example of a 400 to 45,000+ lumens wide angle video light of one embodiment.

FIG. 4 shows for illustrative purposes only an example of a 400 to 45,000+ lumens wide angle video light of one embodiment. FIG. 4 shows the chip-on-board LED 310 for providing illumination in the underwater environment. Power from the rechargeable battery pack 140 is regulated by the digital processor controller 160. The rear mounted magnetic power control ring 152 enables to the videographer to adjust the power to increase or decrease the brightness. The handle 420 allows the videographer to hold the chip-on-board LED 310 for directing the wide-angle illumination as desired of one embodiment.

In one embodiment, the chip-on-board LED 310 produces 400 to 45,000+ lumens wide angle video light with a 5600K color temperature 93CRI LED and ambient water color LEDs. This chip-on-board LED 310 provides lighting to illuminate the depths and capture colors which do not shift when subjects traverse between ambient light and light emitted from the chip-on-board. This compact underwater video light that brings professional-grade illumination to divers and underwater cinematographers of all levels. It features a custom multiple chip-on-board LED light source which includes a high 93CRI 5600K 400 to 45,000+ lumens light and ambient water color LEDs tuned for 6 to 13m depths, and an ambient water color LEDs for depths rated from 13m to 20m.

The video light head units are available for blue, bluish green and green water color use. The use of this custom-built chip-on-board and light head eliminates the need for physical ambient water color filters which are not only cumbersome on video lights, but also rob the light output of brightness. The ability to switch between daylight color and ambient water colors gives the chip-on-board LED 310 complete flexibility to dive a location in any condition, including at night or in very shallow water, when a color filter is not necessary.

An ergonomically located large 10-step rear mounted magnetic power control ring allows for extremely simple and ergonomic operation. The rear LED display 150 shows the lumen's power setting before switching to burn time remaining. A smaller knob on the rear allows the user to switch between daylight, ambient water color at 6m and ambient water color tuned for 13m and deeper.

In LED lighting, chip-on-board stands for chip-on-board. The chip-on-board LED 310 wide angle light includes multiple LED chips bonded directly onto a substrate to form a single, compact module. The chip-on-board LEDs produce a large amount of light bright and focused illumination from a small surface area. The individual LED chips are tightly packed and covered with a single phosphor layer. The chip-on-board LEDs produce a uniform, consistent light with minimal hotspots. The chip-on-board LEDs are energy-efficient, consuming less power while providing brighter output compared to older LED technologies.

The compact and integrated chip-on-board modules reduce the need for additional components like reflectors or diffusers, streamlining lighting fixture designs. The substrate used in the chip-on-board serves as a heat sink, improving heat dissipation and enhancing the LED's lifespan of one embodiment.

Figure 5:
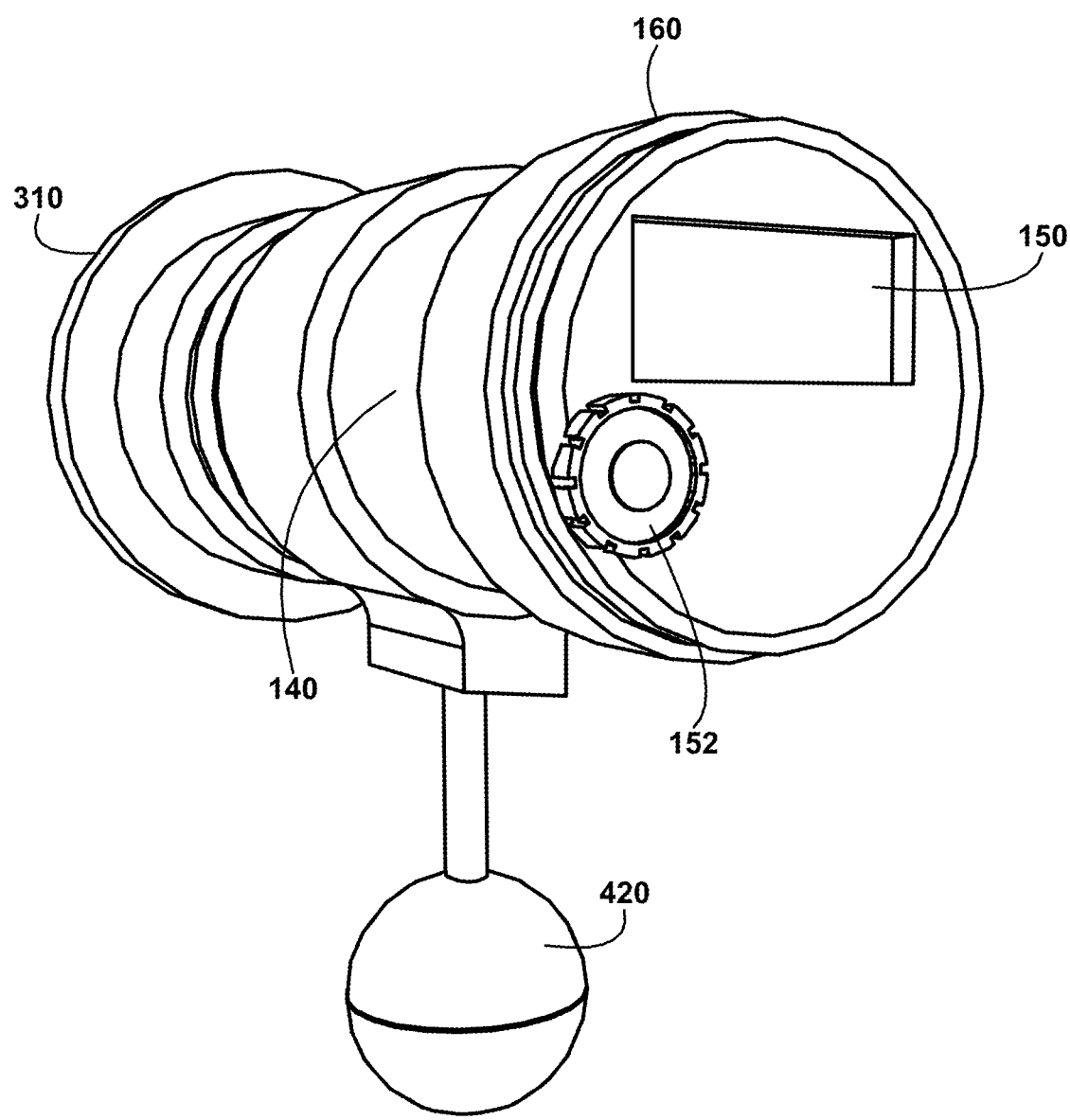
FIG. 5 shows for illustrative purposes only an example of an LED display of one embodiment.

FIG. 5 shows for illustrative purposes only an example of an LED display of one embodiment. FIG. 5 shows a rear view of the chip-on-board LED 310 wide angle light. The chip-on-board LED 310 light includes a rechargeable battery pack 140, digital processor controller 160, rear mounted magnetic power control ring 152, preset cob led color selector 154, handle 420, and LED display 150 in one embodiment.

Figure 6:
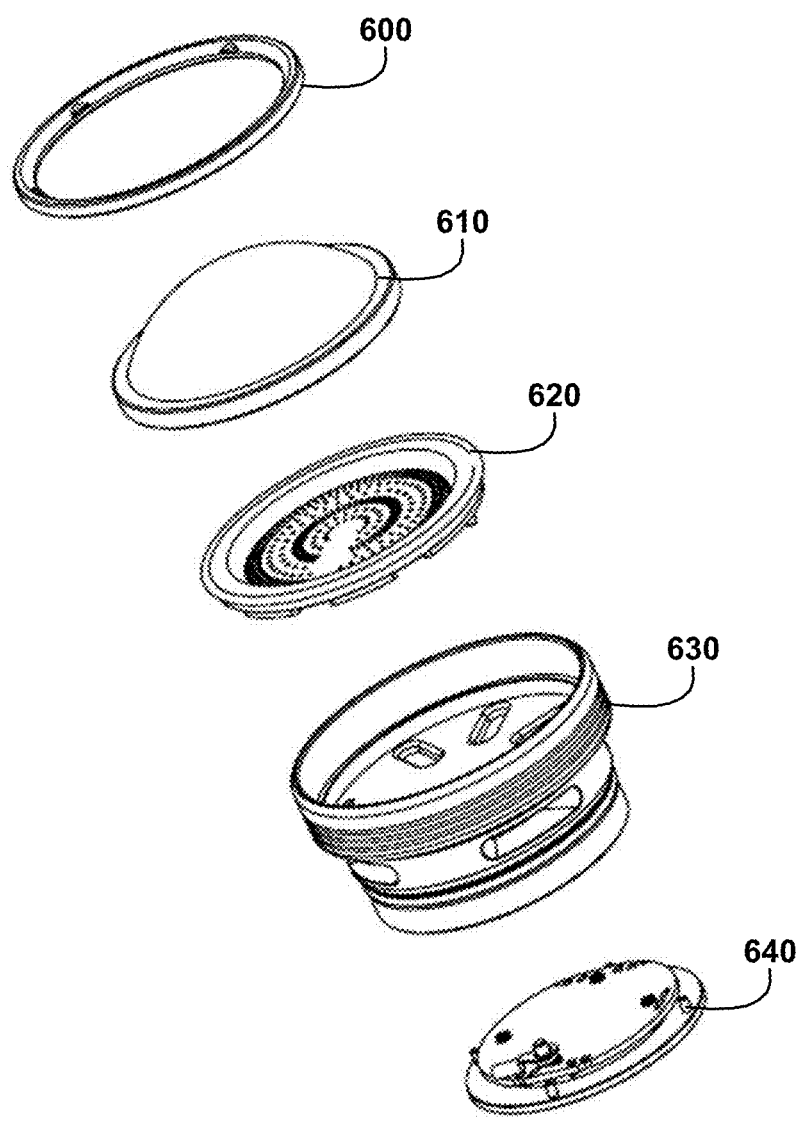
FIG. 6 shows for illustrative purposes only an example of a convex dome cover assembly of one embodiment.

FIG. 6 shows for illustrative purposes only an example of a convex glass dome cover assembly of one embodiment. FIG. 6 shows the components of the chip-on-board LED 310 of FIG. 3 wide angle glass cover and alternatively a glass dome cover light. The components include a metal ring 600, convex glass dome cover 610, chip-on-board LED 620, metal 630, and PCBA 640 of one embodiment.

Figure 7:
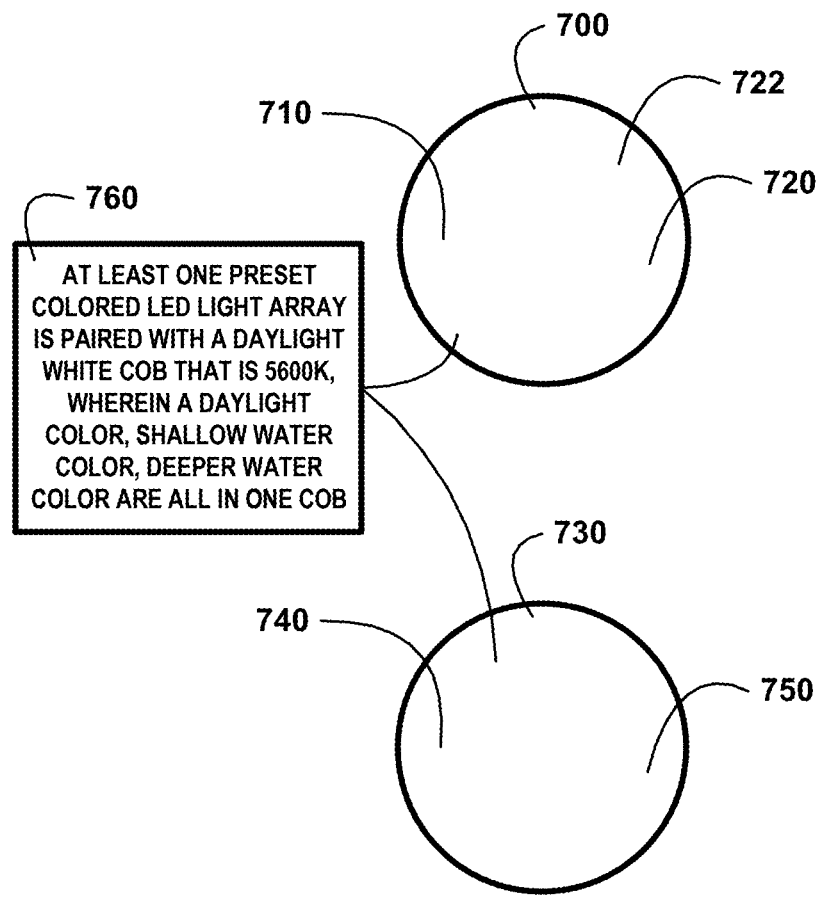
FIG. 7 shows for illustrative purposes only an example of chip-on-board LED preset depth-based color arrays of one embodiment.

FIG. 7 shows for illustrative purposes only an example of chip-on-board LED preset depth-based color arrays of one embodiment. FIG. 7 shows chip-on-board LED preset depth-based color arrays 700. For example, at least one-color array 700 includes daylight colored arrays 710. Another array, for example may include a B6 array 720 for the water color blue to a depth of 6 meters and a B12 array 722 to a depth of 12 meters. Each array is tuned and configured to emit an exact water color at a predetermined color temperature. The diameter of the light head housing may be increased to accommodate an expanded chip-on-board LED array. At least one preset colored LED light array is paired with a daylight white cob that is 5600k, wherein a daylight color, shallow water color, deeper water color are all in one chip-on-board 760.

Yet another array 730 includes an array for the water color green. For example, at least one-color array G6 740 to a depth of 6 meters and G12 750 to a depth of 12 meters. No color mixing is used, and the chip-on-board LED arrays cover the various water colors and depths. The color selector displays the ID of the color depth color selection to allow the videographer to select the appropriate LED array for the location and depth of the filming of one embodiment.

Figure 8:
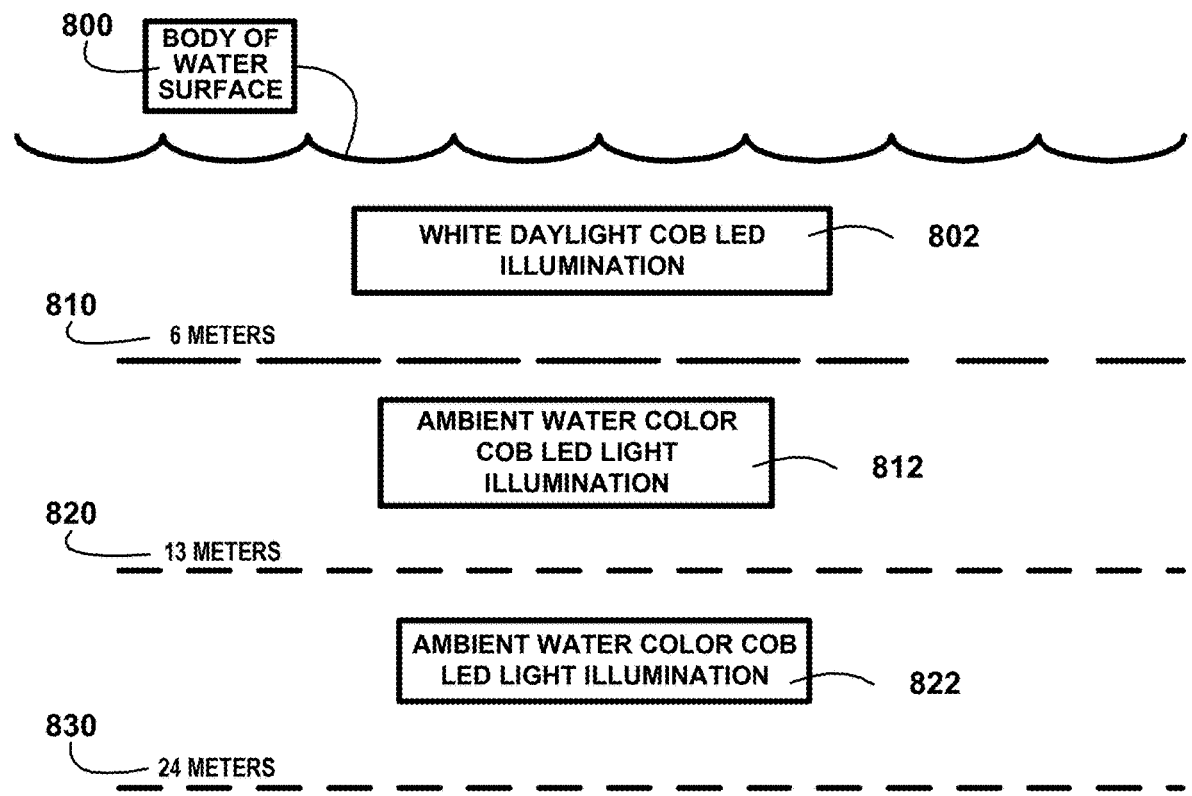
FIG. 8 shows for illustrative purposes only an example of underwater depths of video lights of one embodiment.

FIG. 8 shows for illustrative purposes only an example of underwater depths of video lights of one embodiment. FIG. 8 shows a body of water surface 800. FIG. 8 shows various depths and the illumination best suited for that depth including white daylight chip-on-board LED illumination 802 down to 6 meters 810. Ambient water color chip-on-board LED light illumination 812 to a depth of 13 meters 820 including a blue 12-meter custom LED array. And to a depth of 24 meters a blue 24-meter custom LED array. Ambient water color chip-on-board LED light illumination 822 to a depth of 24 meters 830 including a blue 24-meter custom LED array.

The depth of water significantly influences its perceived color, due to the interaction between sunlight and the physical and optical properties of water. Water selectively absorbs certain wavelengths of light, which alters its color as depth increases including red, orange, yellow, long wavelengths, are absorbed quickly in the first few meters of water. by about 10 meters, most red light is gone. Green and blue these penetrate deeper into the water column. Blue, in particular, travels the farthest, giving deeper water its characteristic blue hue. As depth increases, the dominance of blue wavelengths grows, making water appear increasingly blue.

Figure 9A:
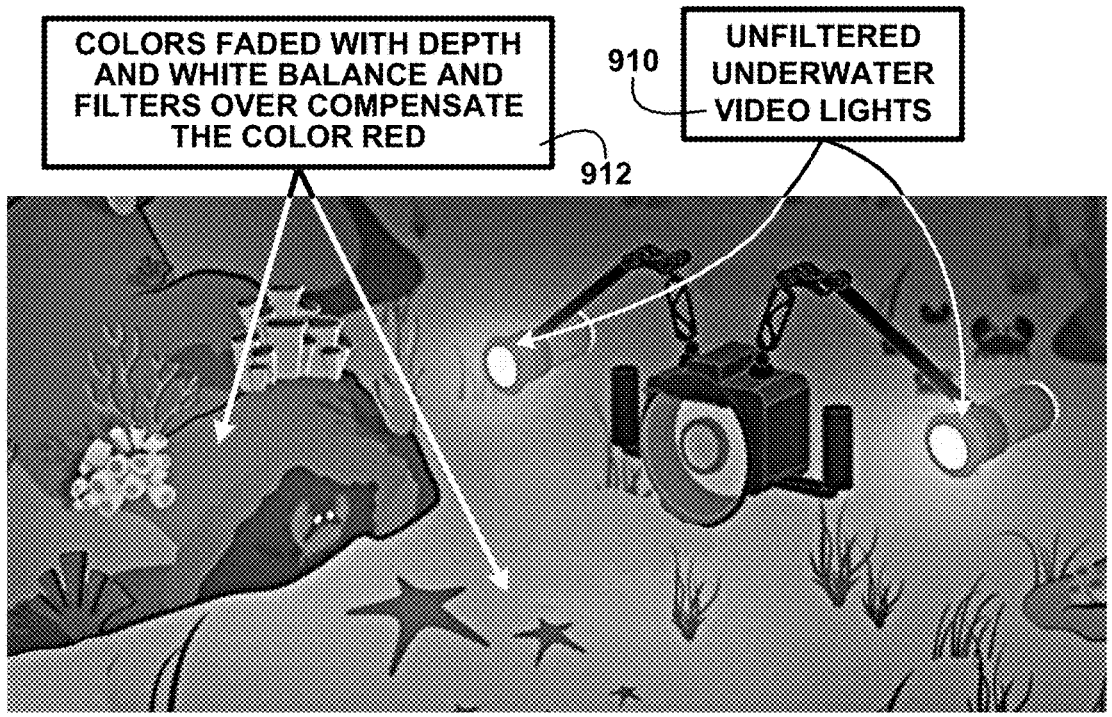
FIG. 9A shows for illustrative purposes only an example of underwater video lights of one embodiment.

FIG. 9A shows for illustrative purposes only an example of underwater video lights of one embodiment. FIG. 9A shows unfiltered underwater video lights 910. The unfiltered underwater video lights 910 are problematic when attempting to capture the real colors of underwater features and marine life when the camera has been accurately white balanced for the ambient water color temperature at said depth. The underwater colors faded with depth and white balance and filters overcompensate the color red 912.

Figure 9B:
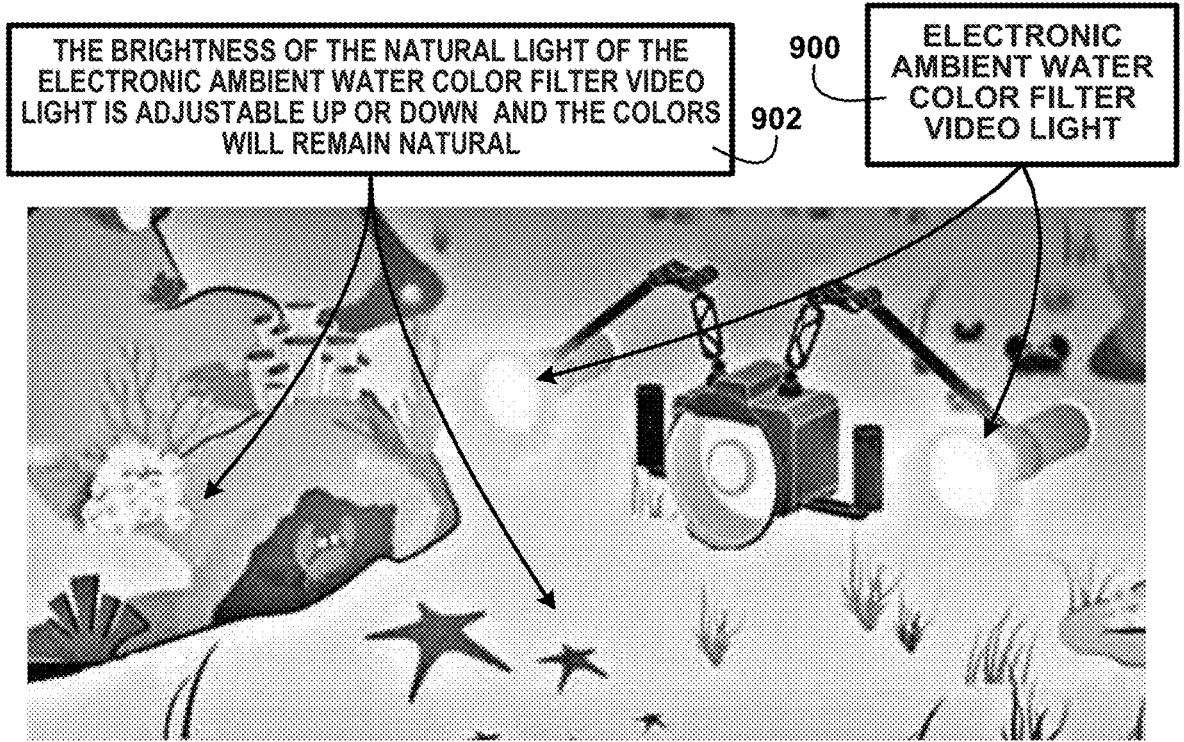
FIG. 9B shows for illustrative purposes only an example of electronic ambient water color filter video light of one embodiment.

FIG. 9B shows for illustrative purposes only an example of electronic ambient water color filter video light of one embodiment. FIG. 9B shows an electronic ambient water color filter video light 900. The "Electronic filter" uses mixed colored light sources to emit colored light to match surrounding water color accurately so that the light projected does not affect the camera's white balance or color filter performance. The brightness of the natural light of the electronic ambient water color filter video light is adjustable up or down and the colors will remain natural 902. This allows accurate photographic and video images to be captured in their real colors. The color of the natural light at the corresponding water depth is recreated to reveal more detail without affecting the manual white balance settings of the camera or the use of a red filter. This produces illumination without affecting color recorded at depth.

Figure 10:
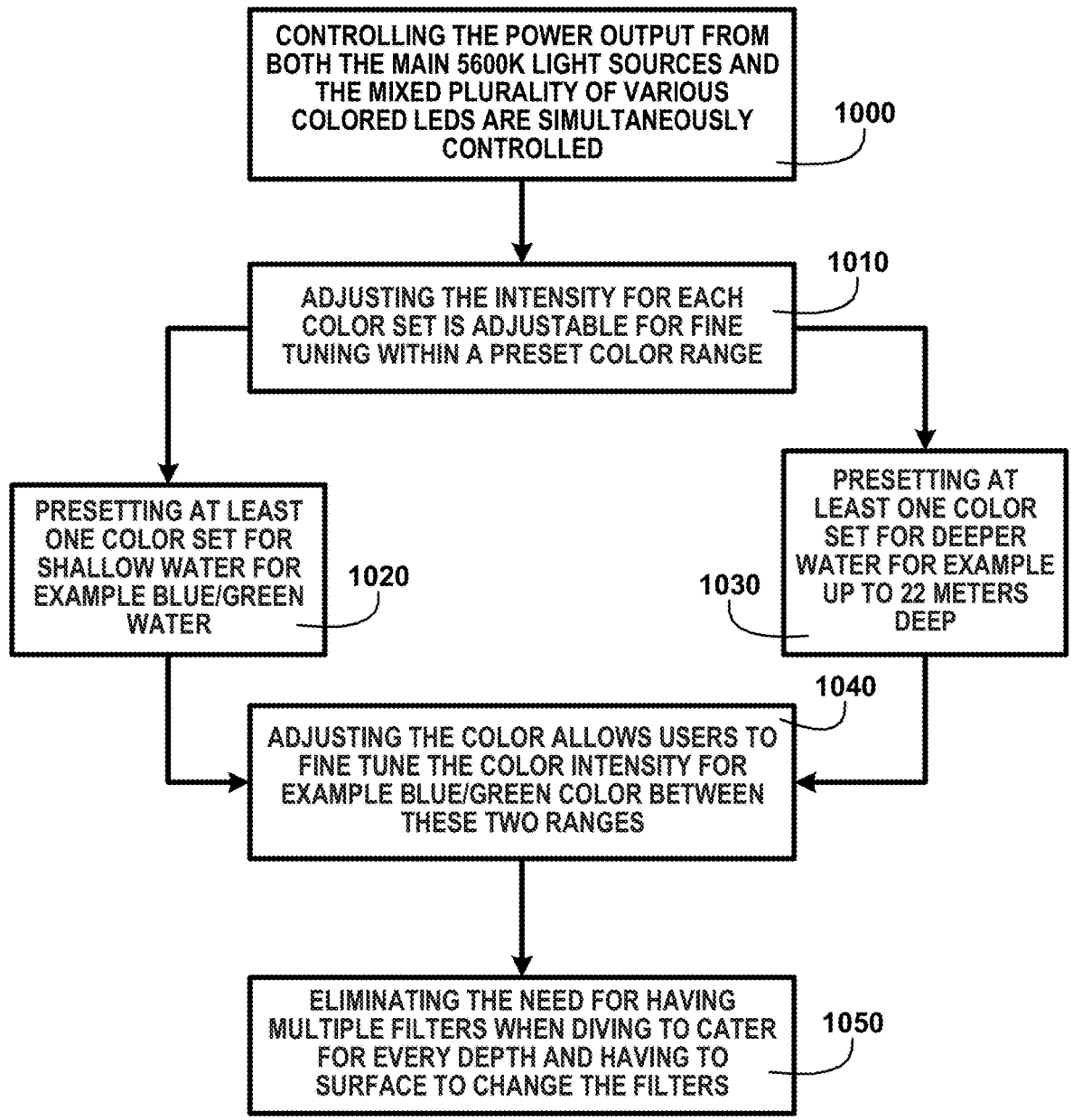
FIG. 10 shows a block diagram of an overview flow chart of operating electronic ambient water color filter video light of one embodiment.

FIG. 10 shows a block diagram of an overview flow chart of operating electronic ambient water color filter video light of one embodiment. FIG. 10 shows controlling the power output from both the main 5600K light source, and the mixed plurality of various colored LEDs are simultaneously controlled 1000. Adjusting the intensity for each color set is adjustable for fine-tuning within a preset color range 1010. Adjusting the intensity for each color set allows tints of the colors to match the changes caused by various water depths. Presetting at least one-color set for shallow water, for example, blue/green water 1020 allows natural colors to be achieved in the brighter shallow water depth range of between 10 ft to 40 ft. The deeper the water, the more colors in the color spectrum are absorbed and become poorly visible.

Some colors seem to "disappear" at certain depths of the ocean, meaning the objects of a certain color will stop absorbing light and appear gray or even black. The water absorbs light produced by the sun; this is called white light, which is a combination of every color (we will get into that later). The color of visible light depends on its wavelength. Presetting at least one-color set for deeper water, for example, up to 22 meters deep 1030. Adjusting the color allows users to fine-tune the color intensity, for example, blue/green color between these two ranges 1040. This eliminates the need for having multiple filters when diving to cater to every depth or having to surface to change the filters 1050.

The power output from both the main 5600k Light source and the mixed light are simultaneously controlled. The brightness of the video lights can be adjusted with just one power knob and the color will remain the same, just less or more brightness for each color temperature setting.

The intensity for each color set would also be manually adjustable via a knob for fine-tuning within a preset range.

The color sets include a preset for shallow water, for example, blue-green water, and have another maximum preset for deeper water (up to 22m). The knob allows users to fine-tune the color intensity, for example, blue-green color, between these two ranges of one embodiment.

Figure 11:
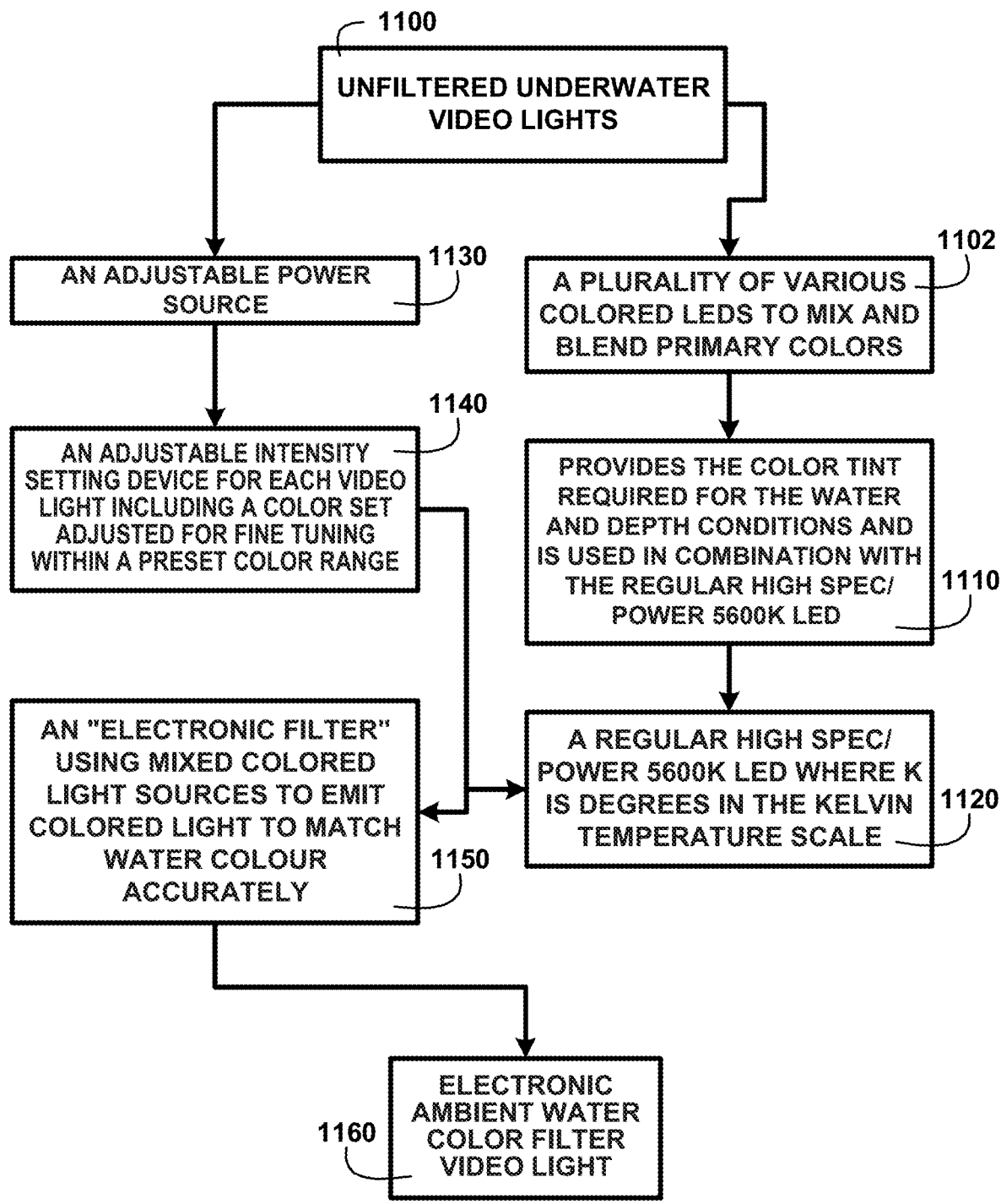
FIG. 11 shows a block diagram of an overview of the mix and blend of primary colors of one embodiment.

FIG. 11 shows a block diagram of an overview of a mix and blend of primary colors of one embodiment. FIG. 11 shows unfiltered underwater video lights 1100. A plurality of various colored LEDS to mix and blend primary colors 1102.

The mix and blend process provides the color tint required for the water and depth conditions and is used in combination with the regular high spec/power 5600K LED 1110. The regular high spec/power 5600K LED, where K is degrees in the Kelvin temperature scale 1120, approximates a natural daylight color temperature.

The electronic ambient water color filter video light 100 includes an adjustable power source 1130. The power source is a battery pack of rechargeable batteries. In one embodiment, the adjustable power source 1130 includes a manually operated control allowing the user to adjust the various individual color LED mixed light intensity according to the water and depth conditions for an accurate and matching ambient water color temperature light. In another embodiment, the adjustable power source 1130 includes electronic methods of determining in-water color temperatures at the underwater location including an automatic light sensor, an automatic white balance sensor, and an automatic power intensity actuator to automatically adjust the adjustable power source 1130 to match the water color temperatures accurately and precisely.

In one embodiment, an adjustable intensity setting device for each video light includes a color set adjusted for fine-tuning within a preset color range 1140. In another embodiment, the "electronic filter" uses mixed colored light sources to emit colored light to match water color accurately 1150. Electronic ambient water color filter video light 1160.

In one embodiment, the color sets will include at least 4 fixed colors including 5600K daylight, blue filtered, blue/green filtered, and green filtered. These fixed color sets have specific shades/hues of each color set. The user switching through each color set would be a manual process of pushing a button to cycle through the options.

In another embodiment, color sets will include automatic electronic methods of determining in-water color temperatures at the underwater location via white balance sensors and have the video lights automatically match these water color temperatures accurately and precisely.

The electronic ambient water color filter video light 1160 uses various colored LEDs to mix and blend primary colors. The colored LED lights provide the tint required and are used in combination with the regular high spec/power 5600K LED. The red light is also sometimes used to get close to underwater creatures at night as most do not notice (or are not bothered by red light.

Figure 12:
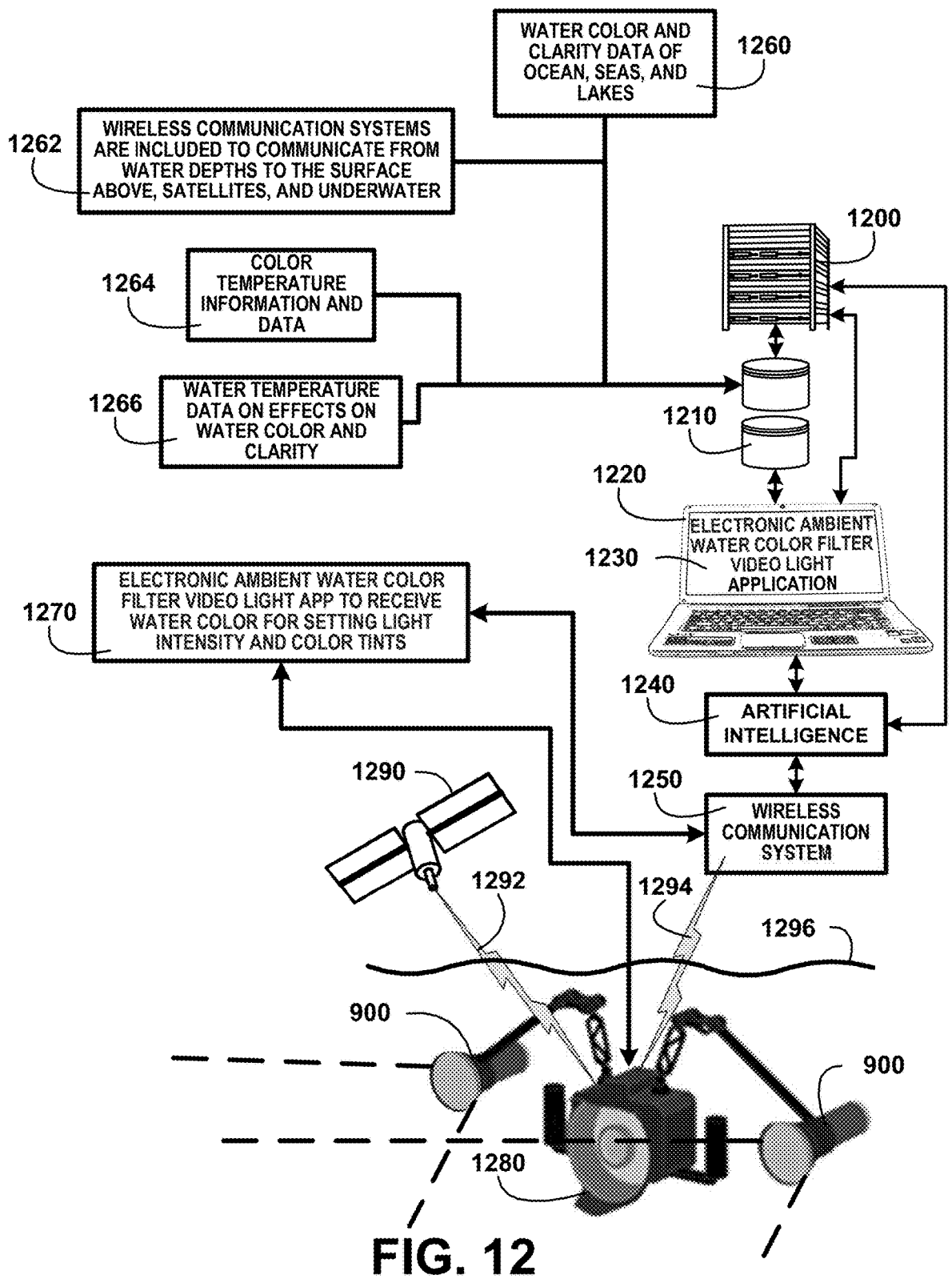
FIG. 12 shows for illustrative purposes only an example of wireless adjustment factors data of one embodiment.

FIG. 12 shows for illustrative purposes only an example of wireless adjustment factors data of one embodiment. FIG. 12 shows in one embodiment a plurality of a server 1200, databases 1210, computer 1220, electronic ambient water color filter video light application 1230, artificial intelligence 1240, and wireless communication system 1250. Water color, corresponding water depth (via a built-in electronic depth/pressure gauge), and clarity data of ocean, seas, and lakes 1260 is collected and stored in the databases 1210. Wireless communication systems are included to communicate from water depths to the surface above, satellites, and underwater 1262. Additional information is stored in the databases 1210 including color temperature information based on various water depths and data 1264 and water temperature data on effects on water color and clarity 1266. An electronic ambient water color filter video light app to receive water color for setting light intensity and color tints 1270 is installed on the computer 1220 and is transmitted to the electronic ambient water color filter video light for lighting and color adjustments. An underwater camera 1280 having the electronic ambient water color filter video light 900 can receive satellite 1290 GPS location 1292 coordinates for transmitting and receiving communication 1294 to and from the water surface 1296. Where the electronic ambient water color filter video light 900 can make adjustments in light intensity and color set tinting of one embodiment.

Figure 13:
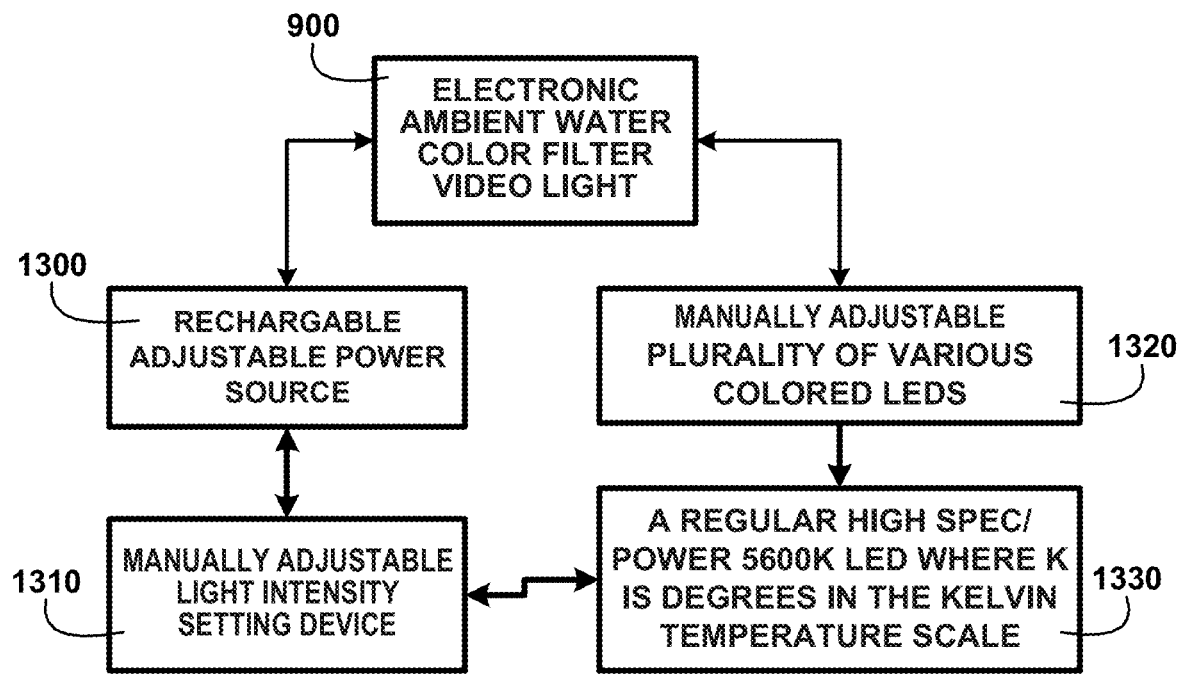
FIG. 13 shows a block diagram of an overview of the manually adjustable light intensity setting device of one embodiment.

FIG. 13 shows a block diagram of an overview of the manually adjustable light intensity setting device of one embodiment. FIG. 13 shows the electronic ambient water color filter video light 900 having a rechargeable adjustable power source 1300, manually adjustable light intensity setting device 1310, a manually adjustable plurality of various colored LEDs 1320, and a regular high spec/power 5600K LED, where K is degrees in the Kelvin temperature scale 1330.

Figure 14:
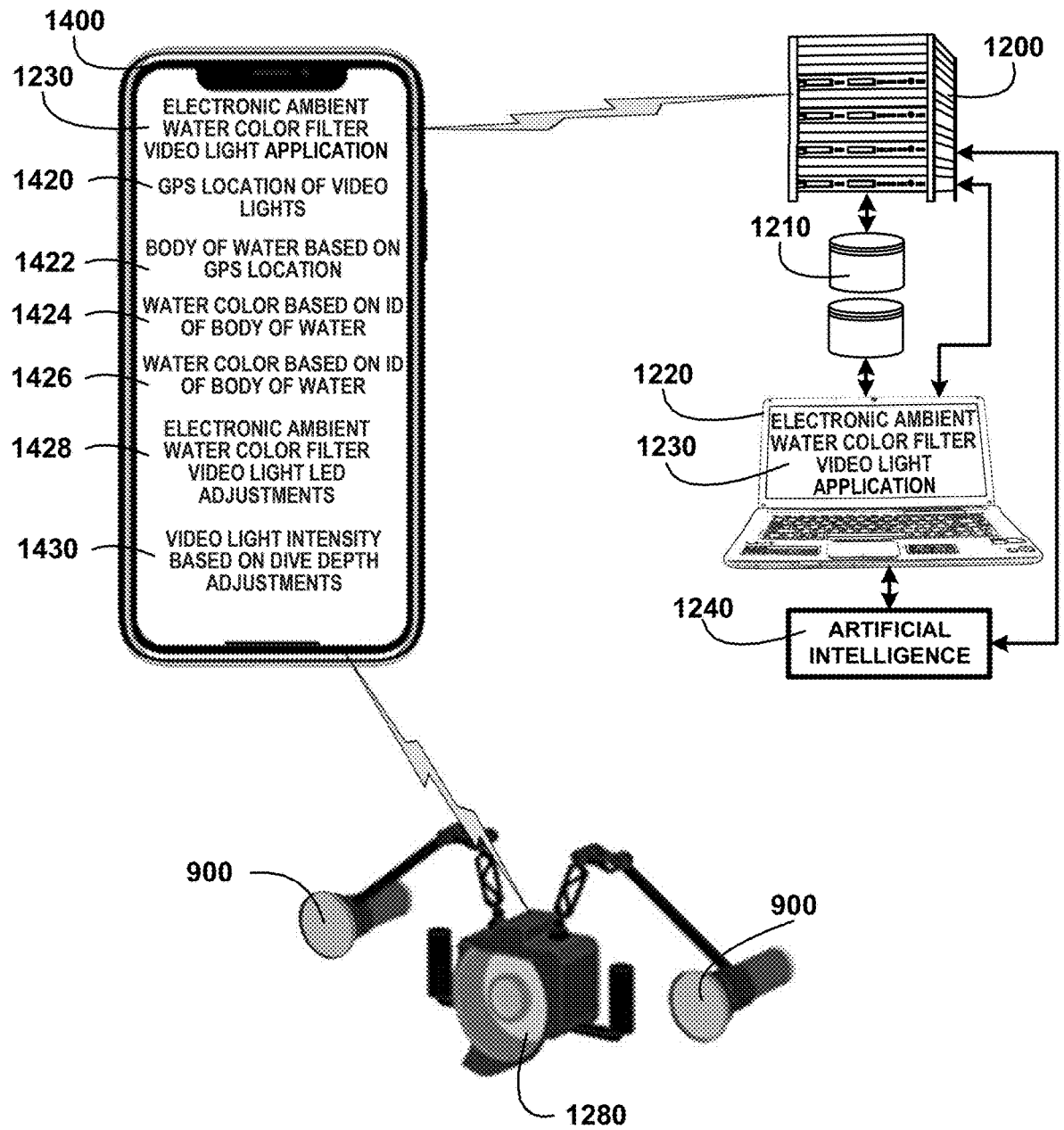
FIG. 14 shows for illustrative purposes only an example of an electronic ambient water color filter video light application of one embodiment.

FIG. 14 shows for illustrative purposes only an example of an electronic ambient water color filter video light application of one embodiment. FIG. 14 shows a plurality of servers 1200, databases 1210 a computer 1220 having an electronic ambient water color filter video light application 1230, and artificial intelligence 1240. A user mobile device 1400 has the electronic ambient water color filter video light application 1230 installed. The user mobile device 1400 is receiving data from the server 1200 including a GPS location of video lights 1420, a name of the body of water based on GPS location 1422, a water color based on the ID of the body of water 1424, a water color based on the ID of the body of water 1426, electronic ambient water color filter video light LED adjustments 1428, and video light intensity based on dive depth adjustments 1430. The underwater camera 1280 adjustments are made using the electronic ambient water color filter video light 900 that includes a GPS location sensor 710 of FIG. 7 of one embodiment.

Figure 15:
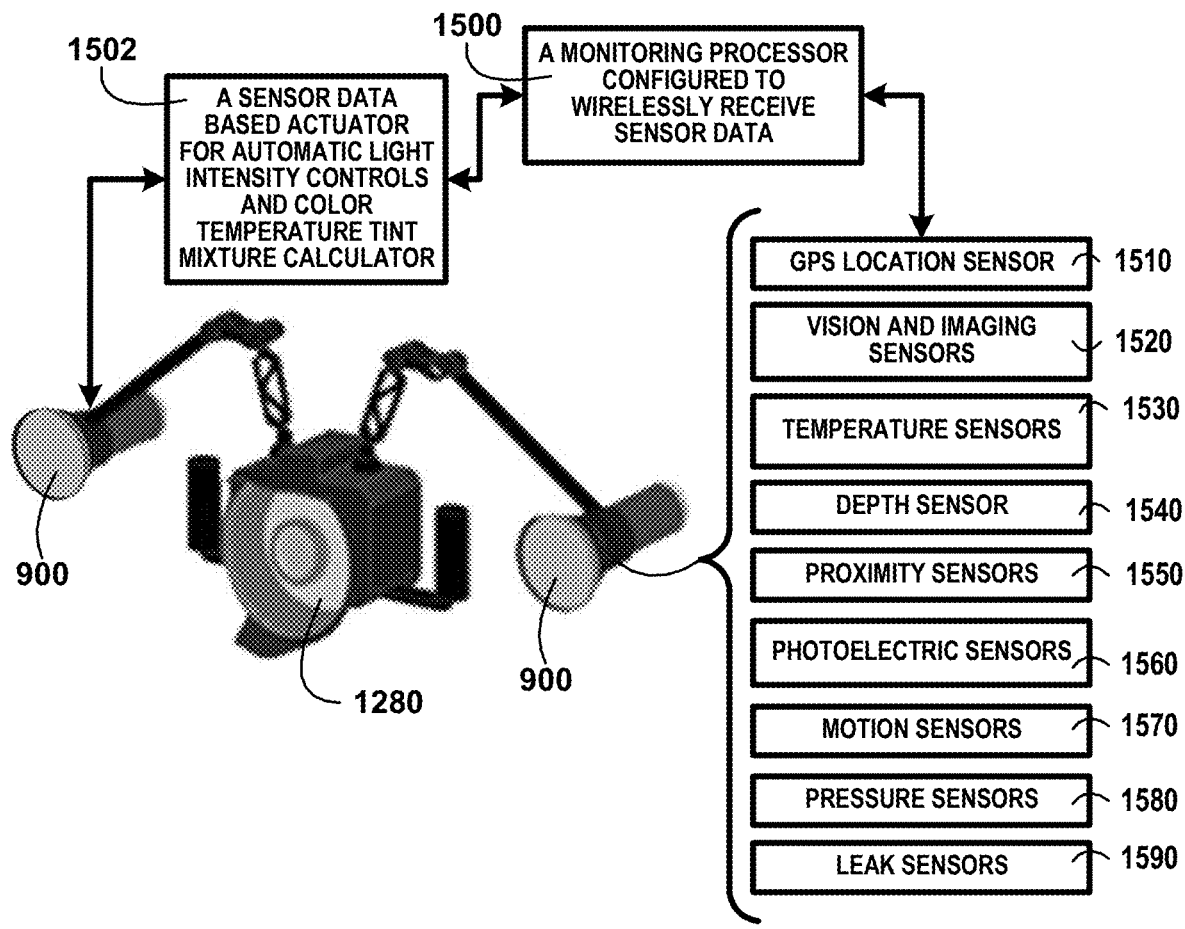
FIG. 15 shows a block diagram of an overview of monitoring data of one embodiment.

FIG. 15 shows a block diagram of an overview of monitoring data of one embodiment. FIG. 15 shows in one embodiment a monitoring processor configured to wirelessly receive sensor data 1500. A sensor data-based actuator is used for automatic light intensity controls and color temperature tint mixture calculator 1502 adjustments. An underwater camera 1280 having the electronic ambient water color filter video light 900 attached in this embodiment includes a GPS location sensor 1510. The GPS location sensor 1510 receives satellite-transmitted GPS coordinates and the GPS location sensor 1510 referring to the databases 1210 of FIG. 12 recorded GPS coordinates of different bodies of water to pinpoint the location to further receive recorded water colors for that specific location with the body of water.

The embodiment further includes at least one of the following group of sensors including vision and imaging sensors 1520, temperature sensors 1530 to measure the ambient temperature of the water, as water temperature can affect color temperatures and absorption, a depth sensor 1540, wherein most divers carry a depth gauge, this depth sensor 1540 transmits the measured depth to the sensor data based actuator to apply temperature corrections to the recorded color temperatures, a proximity sensors 1550 to measure a distance to a particular object of interest to more precisely adjust light intensity to accurately capture images of the particular object of interest.

The photoelectric sensors 1560 accurately measure ambient levels of light at the then current depth, the motion sensors 1570 detect movements of marine life including potential predators, for example, sharks, moray eels, and others to alert the diver, pressure sensors 1580 measure the pressure at the current depth, to alert the diver should the pressure be nearing pressure limits of the photographic equipment and other equipment, leak sensors 1590 to alert the diver of any leaks occurring in the equipment, that may damage the equipment. The sensors can be used to facilitate successful photographic actions of the dive. Natural color capture of the marine life and underwater objects in part depends on adjusting to the depth and color of the water of the dive.

Most segments of the ocean exhibit a predominantly blue hue, although variations occur, ranging from blue-green to green or even yellow to brown in certain regions. The electronic ambient water color filter video light 900 includes a plurality of various colored LEDs to mix and blend primary colors 1300 of FIG. 13. The mix and blend process provides the color tint required for the water and depth conditions and is used in combination with the regular high spec/power 5600K LED 1310 of FIG. 13 to capture natural colors in ocean water colors of all types. The blue coloration of the ocean stems from several contributing factors. Firstly, water selectively absorbs red light, allowing blue light to prevail and be reflected back from the water surface. Given that red light is readily absorbed, its penetration into the ocean is limited, typically extending to depths of less than 50 meters (164 ft). In contrast, blue light can permeate much deeper, reaching depths of up to 200 meters (656 ft).

Secondly, water molecules and minute particles within ocean water exhibit a preference for scattering blue light over light of other wavelengths. This phenomenon of blue light scattering is inherent even in exceptionally clear ocean water and mirrors the process of blue light scattering observed in the atmosphere. The electronic ambient water color filter video light 900 includes an adjustable intensity setting device for each video light including a color set adjusted for fine-tuning within a preset color range 1340 of FIG. 13.

The primary constituents influencing the ocean's color include dissolved organic matter, living phytoplankton containing chlorophyll pigments, and non-living particles such as marine snow and mineral sediments. Satellite observations enable the measurement of chlorophyll levels, serving as a proxy for ocean productivity, specifically marine primary productivity in surface waters. In long-term composite satellite images, regions characterized by heightened ocean productivity manifest in yellow and green hues, indicative of elevated concentrations of green phytoplankton. Conversely, areas with lower productivity exhibit a predominance of blue tones. The electronic ambient water color filter video light 900 includes the "electronic filter" using mixed colored light sources to emit colored light to match water color accurately 1350 of FIG. 13.

Understanding the interplay of these factors not only enhances the comprehension of the diverse colors observed in the ocean but also facilitates the use of remote sensing techniques to assess and monitor oceanic conditions and productivity levels. The electronic ambient water color filter video light 900 capabilities overcome water colors and depth distortions of color to create natural color photographic results when used in conjunction with cameras that have white balance adjustments or when red or magenta filters are employed.

Figure 16:
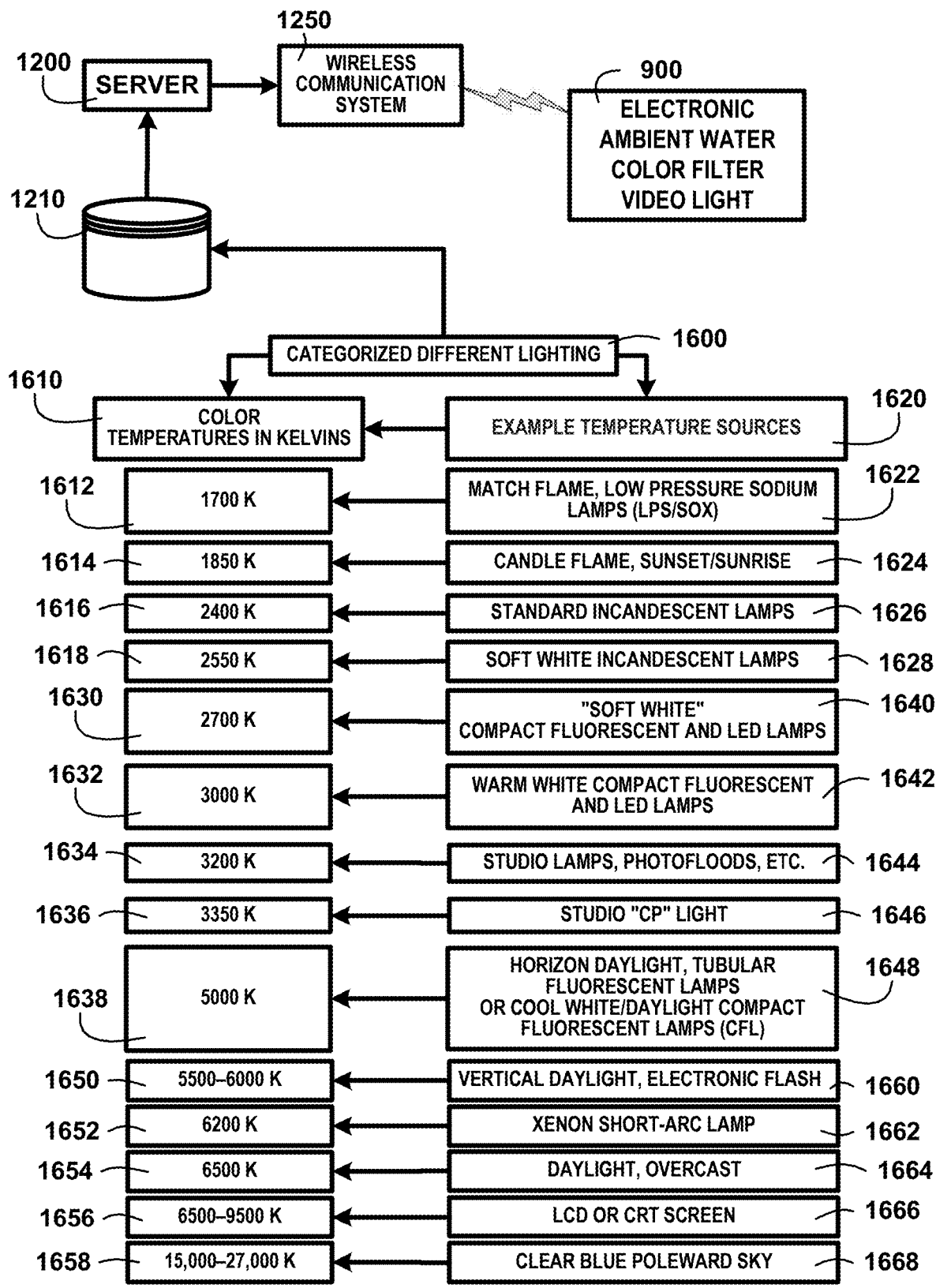
FIG. 16 shows for illustrative purposes only an example of categorized different lighting of one embodiment.

FIG. 16 shows for illustrative purposes only an example of categorized different lighting of one embodiment. FIG. 16 shows color temperatures in degrees Kelvin with examples of light sources for clarity of understanding the light levels at the various color temperatures. The categorized different lighting 1600 shows color temperatures in Kelvins 1610, based on degrees on the Kelvin temperature scale. Sample temperature sources 1620 illustrate the lighting levels corresponding to the color temperature.

The levels are shown in color temperatures ranging from lower to higher, for example, at 1700 K 1612 is approximately the level of a match flame, low-pressure sodium lamps (LPS/SOX) 1622. The examples continue with 1650 K 1614 for a candle flame, sunset/sunrise 1624, 2400 K 1616 for a standard incandescent lamps 1626, 2550 K 1618 for a soft white incandescent lamps 1628, 2700 K 1630 for a soft white compact fluorescent and LED lamps 1640, and 3000 K 1632 for a warm white compact fluorescent and LED lamps 1642.

Additional color temperatures include 3200 K 1634 for lamps for studios and similar environments, photofloods, etc., 1644 and 3350 K 1636 for a studio "CP" light 1646. Examples in daylight include a color temperature of 5000 K 1638 for horizon daylight, tubular fluorescent lamps, or cool daylight compact fluorescent lamps (CFL) 1648 and 5500-6000 K 1650 for vertical daylight, and electronic flash 1660. A color temperature at 6200 K 1652 is substantially equivalent to a xenon short-arc lamp 1662. A color temperature of 6500 K 1654 is substantially equivalent to daylight, overcast 1664 with cloud cover. Daylight has a spectrum similar to that of a black body with a correlated color temperature of 6500 K. For colors based on black-body theory, blue occurs at higher temperatures, whereas red occurs at lower temperatures. This is the opposite of the cultural associations attributed to colors, in which "red" is "hot", and "blue" is "cold".

A color temperature of 6500-9500 K 1656 is substantially equivalent to an LCD or CRT screen 1666. The color temperatures ranging from 15,000-27,000 K 1658 are present in a clear blue poleward sky 1668. The color temperature data is recorded in databases 1210 for use in determining adjustments in light intensity using adjustments in the power source of the electronic ambient water color filter video lights.

Databases 1210 transmit the color temperature data to the server 1200. The server 1200 sends the color temperature data to the wireless communication system 450 for communication to the electronic ambient water color filter video light 900 to adjust the intensity of the light to overcome the specific body of water color temperature of the water.

Color temperature serves as a metric for characterizing the color of visible light and is defined by comparing the light's color to that emitted by an idealized opaque, non-reflective body. The temperature of the ideal emitter closely matching the original light source's color is termed the color temperature. This parameter is typically expressed in degrees on the Kelvin scale (K) and finds applications in diverse fields such as lighting, photography, videography, publishing, manufacturing, and astrophysics.

The color temperature scale describes the color of light emitted by a source, irrespective of its actual temperature. While color temperature has broad applications, its significance is most pronounced for light sources exhibiting a close correspondence to the color of a black body, ranging from red to orange, yellow, white, to bluish-white. Although the concept of correlated color temperature expands to any visible light, practical utility diminishes for colors like green or purple. Color temperature is conventionally expressed in kelvins (K), symbolized as K, representing an absolute temperature unit.

"Cool colors," characterized by color temperatures exceeding 5000 K, exhibit bluish tones, while "warm colors," with lower color temperatures (2700-3000 K), manifest yellowish hues. It is essential to note that "warm" and "cool" references pertain to traditional color categorizations rather than black body temperature. The hue-heat hypothesis suggests that lower color temperatures are perceived as warmer, while higher temperatures are perceived as cooler. This perception contrasts with the fact that warm-colored light sources often emit significant infrared radiation, leading to potential confusion.

The Sun, approximating a black-body radiator, has an effective temperature of 5772 K. The color temperature of sunlight above Earth's atmosphere is approximately 5900 K. The Sun's appearance, varying from red to white, depends on its position in the sky, with these changes attributed to sunlight scattering rather than alterations in black-body radiation. Rayleigh scattering by Earth's atmosphere causes the blue color of the sky, scattering blue light more than red. During the early morning and late afternoon, known as the golden hours, daylight exhibits a lower ("warmer") color temperature due to increased scattering of shorter-wavelength sunlight—an optical phenomenon known as the Tyndall effect. Daylight, conforming to a black body's spectrum, has a correlated color temperature of 6500 K (D65 viewing standard) or 5500 K (daylight-balanced photographic film standard).

Figure 17:
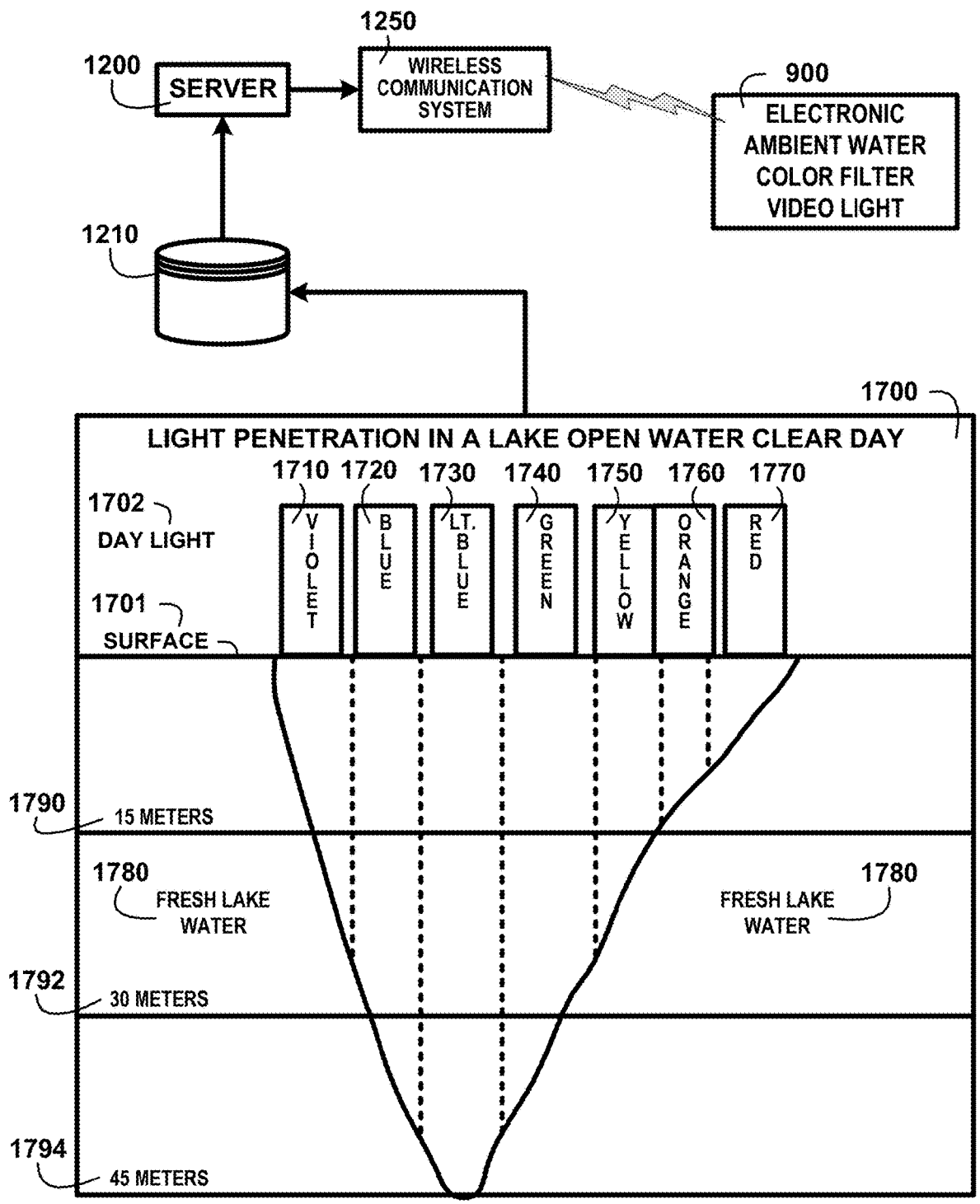
FIG. 17 shows for illustrative purposes only an example of light penetration in ocean water on a clear day of one embodiment.

FIG. 17 shows for illustrative purposes only an example of light penetration in ocean water on a clear day of one embodiment. FIG. 17 shows light penetration in a lake open water clear day 1700. The penetration is shown below the surface for daylight 1702. The colors not shown are left to right violet 1710, blue 1720, light blue1730, green 1740, yellow 1750, orange 1760, and red 1770. The color wavelengths left to right range from 300, 400, 500, 600, to 700 λ. The effect of the color absorption in fresh lake water 1780 is shown in depth meters down to 45 meters. On the surface 0 meters 1701, 15 meters 1790, 30 meters 1792, and 45 meters 1794. The penetration data of degradation for the colors is recorded in the databases 1210. The penetration data is used for determinations of adjusting the intensity for each color set.

The databases 1210 transmit the ocean depth light penetration data to the server 1200. The server 1200 sends the specific ocean depth light penetration data to the wireless communication system 1250 for communication to the electronic ambient water color filter video light 900 to adjust the intensity of the light to overcome the specific ocean depth light penetration.

As sunlight penetrates the ocean, longer wavelengths with higher energy levels are absorbed initially, transferring their energy to water particles. Due to its longer wavelength in the visible color spectrum, red is the first to be absorbed and disappears in water, causing red objects below approximately 20 feet to appear black.

The superior absorption of longer wavelengths like red and orange, the prevalent blue color in the ocean. This apparent contradiction is explained by the fact that the sun emits more blue wavelengths than violet, and human vision is more sensitive to blue than violet. The sun's color emissions show violet at the edge of the visible light spectrum. Additionally, the ocean's color perception is influenced by the fact that beyond the 700 nm range, invisible infrared wavelengths constitute over half of the sun's emissions.

Wavelengths, carrying energy, transfer heat when absorbed by objects. This thermal transfer explains why white objects remain cooler than black ones in the sun, as white reflects all wavelengths, while black absorbs them.

Considering the ocean's reflection characteristics, blue is the most prominent color, making it challenging to spot blue fish, which would appear to glow due to the reflected blue light. The coloration of marine organisms, often black or red in deep-sea environments, serves as an evolutionary advantage, preventing light reflection.

Figure 18:
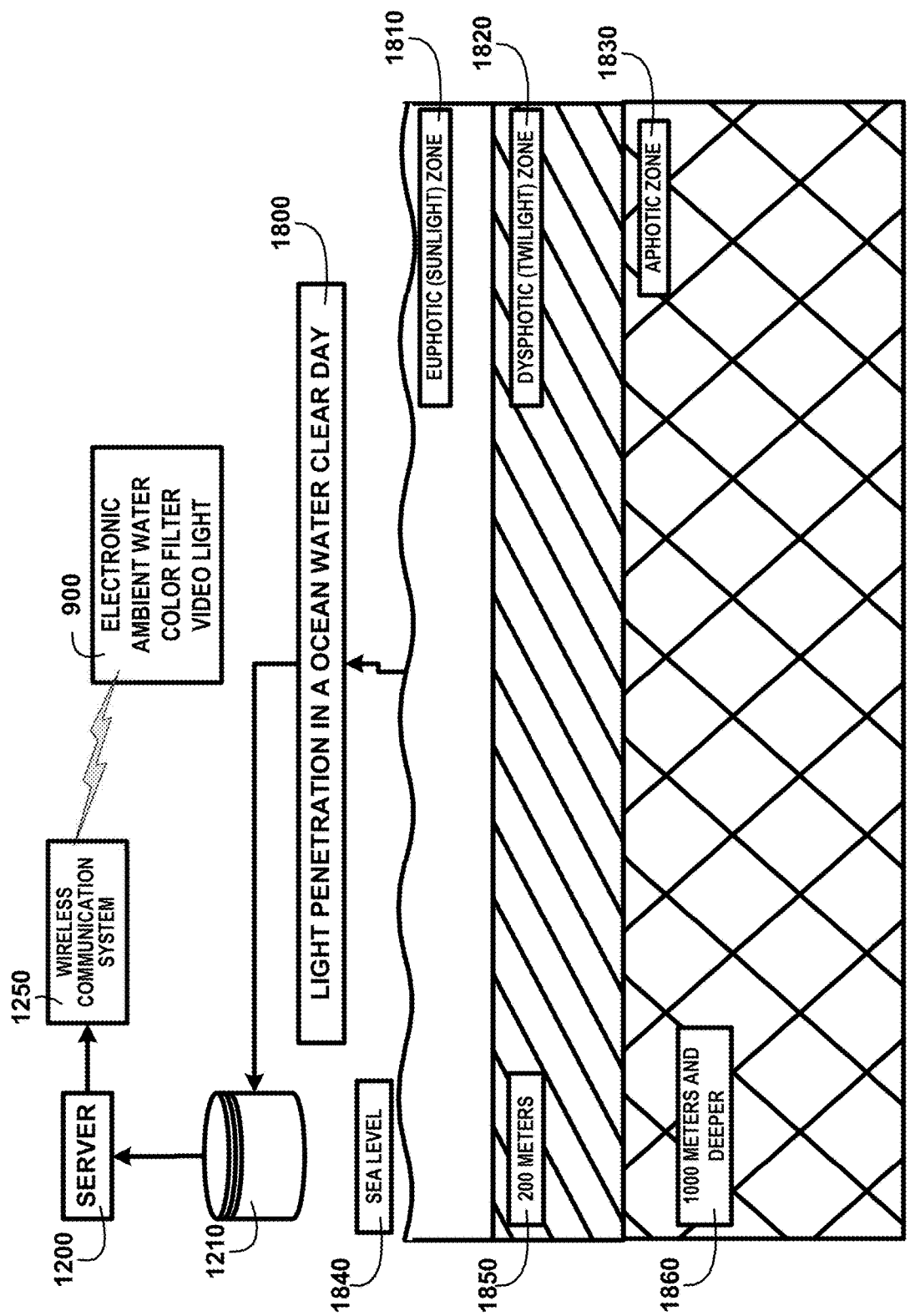
FIG. 18 shows for illustrative purposes only an example of light penetration in ocean water on a clear day of one embodiment.

FIG. 18 shows for illustrative purposes only an example of light penetration in ocean open water on a clear day of one embodiment. FIG. 18 shows light penetration in an ocean water on a clear day 2000. FIG. 18 shows a euphotic (sunlight) zone 1810 that receives daylight from the sea level 1040 (surface of the water) to a depth of 200 meters 1850. Below the euphotic (sunlight) zone 1810 is the dysphotic (twilight) zone 1820. The dysphotic (twilight) zone 1820 ranges from 200 meters 1850 to 1000 meters 1860. An aphotic zone 1830 extends from 1000 meters and deeper 1860. The zones and depths data are stored on the databases 1210 of one embodiment.

The databases 1210 transmit the ocean color light penetration data to the server. The server 1200 sends the specific ocean depth light penetration data to the wireless communication system 1250 for communication to the electronic ambient water color filter video light 100 to adjust the intensity of the light to overcome the specific ocean color light penetration.

Figure 19A:
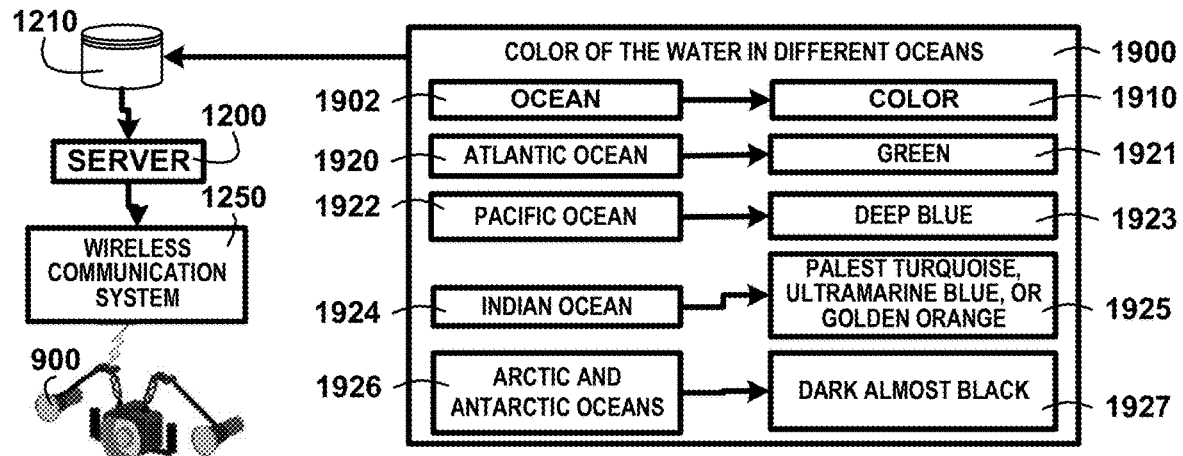
FIG. 19A shows a block diagram of an overview of the color of the water in different oceans of one embodiment.

FIG. 19A shows a block diagram of an overview of the color of the water in different oceans of one embodiment. FIG. 19A shows the color of the water in different oceans 1900. The information includes the name of the ocean 1902 and the typical color 1910 assessed to the ocean. It should be recognized that due to the extensive size of oceans, the color of micro areas within the ocean may vary. For example, the Atlantic Ocean 1920 in general is assessed with a green 1921 color, although the precise color at each location can vary. The Pacific Ocean 1922 usually has a deep blue 1923 color. The Indian Ocean 1924 is attributed with multiple colors including palest turquoise, ultramarine blue, or golden orange 1925. The extremely cold-water temperatures give the waters of the Arctic and Antarctic Oceans 1926 a dark almost black 1927 color. The color attributes of the oceans are recorded in the databases 1210 of one embodiment.

The ocean's coloration extends beyond the typical blue spectrum, showcasing diverse hues influenced by various factors. Along the East Coast of the United States, the Atlantic Ocean often presents a greenish appearance, attributable to the abundance of algae and plant life. Photosynthetic organisms, containing chlorophyll, contribute to this green coloration while simultaneously absorbing red and blue light. Moving to the Pacific Ocean, its waters are renowned for displaying a deep blue color. This characteristic is evident in wave views near locations like Encinitas, California. The Pacific Ocean stands out for harboring some of the world's deepest blue-colored waters, creating a distinctive visual identity.

Arctic and Antarctic waters, marked by extreme cold temperatures and the presence of sea ice, can exhibit dark and gloomy appearances. Despite these harsh conditions, these regions possess captivating beauty and biodiversity, featuring unique wildlife and stunning landscapes. The challenging environment, while often austere, contributes to the allure of these polar waters.

In contrast, the Indian Ocean stands out as the most diverse among Earth's oceans, exhibiting a spectrum of colors ranging from the palest turquoise to ultramarine blue and even golden orange hues. Recognized as the warmest ocean on the planet, the Indian Ocean covers one-fifth of Earth's surface, combining warmth with a vibrant palette, making it a region of exceptional ecological and aesthetic richness.

The databases 1210 can be used with the lighting equipment of the present invention in these ocean environments to transmit data to the server. The server 1200 sends the specific ocean color of the water data to the wireless communication system 1250 for communication to the electronic ambient water color filter video light 900 to adjust the intensity of the light to overcome the ocean color of the water.

Figure 19B:
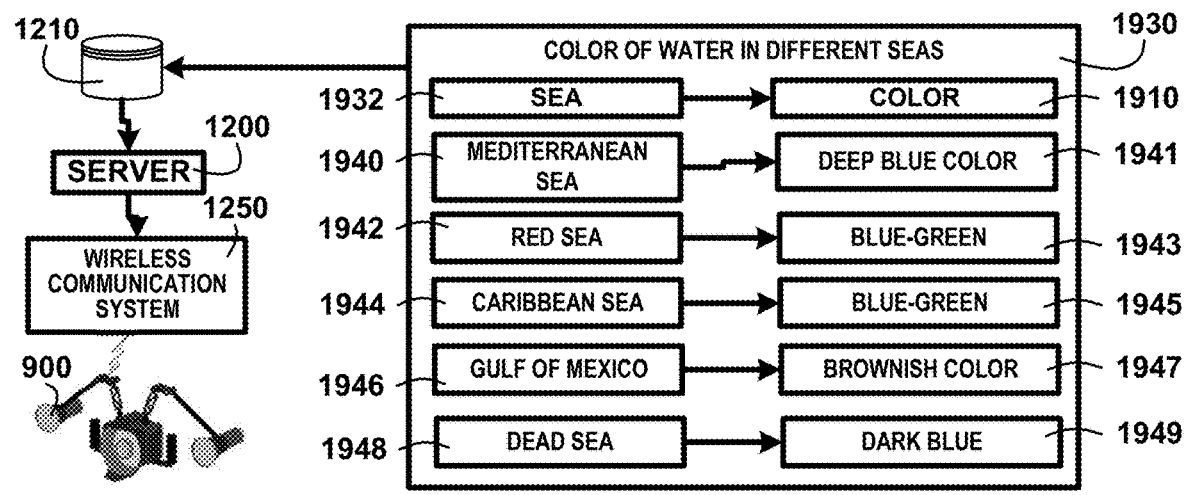
FIG. 19B shows a block diagram of an overview of the color of water in different seas of one embodiment.

FIG. 19B shows a block diagram of an overview of the color of water in different seas of one embodiment. FIG. 19B shows the color of water in different seas 1930. The information includes the name of the sea 1932 and its attributed color 1910 of the water. For example, the Mediterranean Sea 1940 has a deep blue color 1941, the Red Sea 1942 a blue-green 1943 color, the Caribbean Sea 1944 a blue-green 1945 color, the Gulf of Mexico 1946 has a brownish color 1947, and the Dead Sea 1948 has a dark blue 1949. The color of water in different seas data is recorded and stored in the databases 1210 of one embodiment.

The databases 1210 transmit the data to the server 1200. The server 1200 sends the specific sea color of the water data to the wireless communication system 1250 for communication to the electronic ambient water color filter video light 900 to adjust the intensity of the light to overcome the sea color of the water.

Figure 19C:
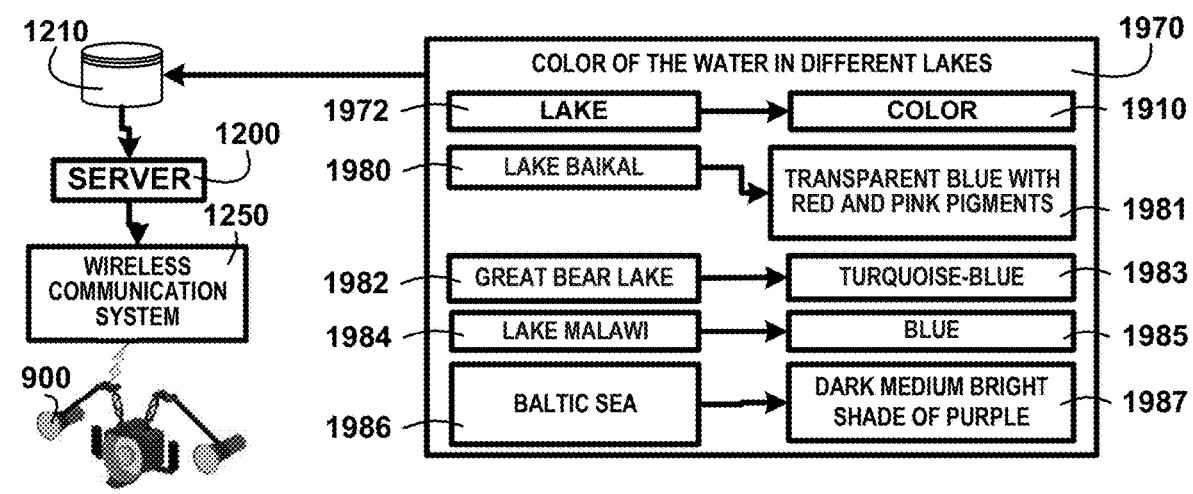
FIG. 19C shows a block diagram of an overview of the color of water in different lakes of one embodiment.

FIG. 19C shows a block diagram of an overview of the color of water in different lakes of one embodiment. FIG. 19C shows the color of the water in different lakes 1970. Lakes can be different colors for a variety of reasons. The most common color is blue, but lakes can also be green, brown, or even pink. A few factors, including the presence of algae, minerals in the water, and the water's depth, determine the lake's color. FIG. 19C shows the name of a lake 1972 and its corresponding color 1910.

The present invention and the server 1200 and database 1210 of FIG. 19C is used to assist lighting adjustments in numerous real-world environments. For example, Cyanobacteria, a type of bacteria that contains a pigment called phycocyanin is one cause of the blue color of lakes. The Cyanobacteria contains a pigment that absorbs blue light and reflects back the blue color. This is one reason lakes appear blue when viewed from above. Lakes with many nutrients, such as phosphate and nitrogen, frequently have high concentrations of Cyanobacteria.

Also, vegetation surrounding a lake can cause a greenish color in the lake due to the presence of algae. The algae uses photosynthesis to convert sunlight into energy, producing oxygen and nutrients that feed other organisms causing the lake water to take on a greenish color. Lake water that becomes contaminated by organic matter releases tannins when decaying giving the lake water a brownish-yellowish tint. Other factors including depth, clarity, and surrounding landscape can affect the color of a brown lake. Algae, such as *dunaliella salina*, can produce carotenoids that create a red or rose-colored hue to lake water. The pink lake color can be seen, for example, in Lake Retba in Senegal, Mono Lake in California due to increased levels of salt production, and Chilko Lake in British Columbia, Canada, where evaporation has resulted in a red hue.

Other causes of lake colors include rock and sediment particles. Minerals reflect light at different wavelengths, which leads to different colors. The color of a lake can range from shades of blue-green to brownish-red due to the type and amount of minerals in the water. Rocks can reflect colors ranging from white to a rusty red shade in the water. Sediment particles can also contribute to lake color variation.

A photochemical reaction caused by ultra-violet (UV) light between various molecules causes a chemical change resulting in the production of pink lakes. Some bacteria in these lakes use this chemical reaction to protect against sunlight by producing colorful pigments that absorb UV radiation and protect the bacteria cells from damage. Light scattering occurs when light waves encounter particles or molecules in the water. This changes color from blue to red due to water molecules' absorption of red light at a nuclear level. Minerals can cause lake color variation due to their chemical composition and interaction with sunlight.

Water temperature affects lake color. Temperature increases cause more particles to be dissolved into the water, which changes its color ranging from green to brownish red. Colder temperatures cause less particle dissolution, resulting in clearer, bluer waters. Conversely, warmer temperatures lead to increased dissolution of particles which can result in a variety of colors depending on the type of particles present in the water.

For example, lake Baikal 1980 has a color of transparent blue with red and pink pigments 1981, Great Bear Lake 1982 has a color of turquoise-blue 1983, Lake Malawi 1984 has a color of blue 1985, and the Baltic Sea 1986, which is classified as a lake, has a color of a dark medium bright shade of purple 1987. A listing of lakes and their colors is recorded in the databases 1210.

The databases 1210 transmit the data to the server 1200. The server 1200 sends the specific lake color of the water data to the wireless communication system 450 for communication to the electronic ambient water color filter video light 900 to adjust the intensity of the light to overcome the lake color of the water.

Figure 20:
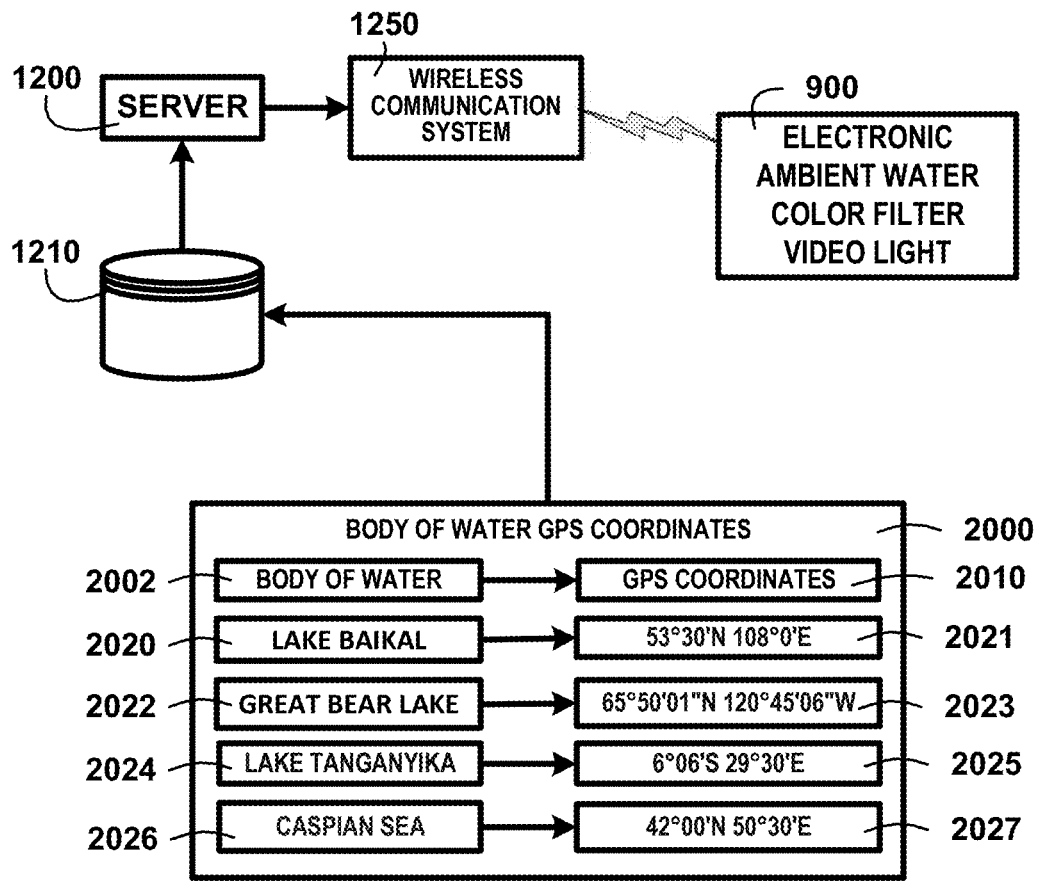
FIG. 20 shows a block diagram of an overview of the body of water with GPS coordinates of one embodiment.

FIG. 20 shows a block diagram of an overview of the body of water with GPS coordinates of one embodiment. FIG. 20 shows the body of water with GPS coordinates 1000. The information includes the body of water 2002 and its GPS coordinates 2010. Oceans and seas are so large that a single GPS coordinate is not adequate to determine the location accurately. Examples of GPS coordinates 2010 include four lakes, Lake Baikal 2020 at 53°30'n 1016°0'e 2021, Great Bear Lake 2022 at 65°50'01"n 120°45'06"w 2023, Lake Tanganyika 2024 at 6°06's 29°30'e 2025, and the Caspian Sea 2026 at 42°00'n 50°30'e 2027. The lake GPS coordinates 2000 are stored in the databases 1210 for identifying the location of the diver using the electronic ambient water color filter video light 900.

The databases 1210 transmit the body of water GPS coordinates 2000 data to the server 1200. The server 1200 sends the body of water GPS coordinates 2000 to the wireless communication system 1250 for communication to the electronic ambient water color filter video light 900 to match the satellite received GPS location of video lights 1620 of FIG. 16 to the body of water GPS coordinates 2000 data. The name of the body of water is confirmed. The name of the body of water triggers the server 1200 to transmit data related to the water color and corresponding color temperature to the electronic ambient water color filter video light 900 to facilitate the adjustments of the light intensity and color LED tinting to result in precise lighting to result in natural light video captures of the underwater camera.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. An underwater video light system, comprising:
    a chip-on-board LED light configured to project multiple-colored LED light arrays in an underwater environment from a chip-on-board LED module;
    at least one preset colored LED light array is paired with a daylight white chip-on-board LED, wherein a daylight color, shallow water color, deeper water color are all in one chip-on-board;
    wherein the chip-on-board LED light is configured to project the chip-on-board LED light in a wide angle illumination in the underwater environment;
    at least one digital processor controller coupled to the chip-on-board LED light configured to regulate power transmission to the chip-on-board LED light module;
    at least one rechargeable battery pack coupled to the chip-on-board LED light, to provide power to the chip-on-board LED module; and
    an LED display coupled to the chip-on-board LED light configured to display operating settings and color selections.

2. The underwater video light system of claim 1, wherein the LED display shows the lumen's power setting in a range between 400 to 45,000+ lumens, burn time remaining, and includes a smaller knob to allow the user to switch between daylight that is 5600k and ambient preset water color arrays.

3. The underwater video light system of claim 1, wherein the diameter of the light head housing may be increased to accommodate an expanded chip-on-board LED array.

4. The underwater video light system of claim 1, wherein the preset custom colored LED arrays are based on depth and ambient water colors and are preset arrays cover all depths and mimic various water colors at the depths and color temperatures.

5. The underwater video light system of claim 1, wherein each array is tuned and configured to emit an exact water color at a predetermined color temperature.

6. The underwater video light system of claim 1, wherein the chip-on-board LED arrays cover the various water colors and depths with no color mixing.

7. The underwater video light system of claim 1, wherein the chip-on-board LED light is configured to project daylight color underwater to a depth of up to 6 meters.

8. The underwater video light system of claim 1, wherein the chip-on-board LED module individual LED chips are tightly packed on a substrate and covered with a single phosphor layer.

9. An underwater video light system, comprising: a chip-on-board LED light configured to project multiple-colored LED light arrays in an underwater environment from a chip-on-board LED module; at least one preset colored LED light array is paired with a daylight white chip-on-board, wherein a daylight color, shallow water color, deeper water color are all in one chip-on-board;
    wherein the chip-on-board LED light is configured to project the chip-on-board LED light in a wide angle illumination in the underwater environment;
    at least one digital processor controller coupled to the chip-on-board LED light configured to regulate power transmission to the chip-on-board LED light module;
    at least one rechargeable battery pack coupled to the chip-on-board LED light, to provide power to the chip-on-board LED module; and
    an LED display coupled to the chip-on-board LED light configured to display operating settings and color selections.

10. The underwater video light system of claim 9, wherein the LED display shows the lumen's power setting in a range between 400 to 45,000+ lumens, burn time remaining, and includes a smaller knob to allow the user to switch between daylight that is 5600k and ambient preset water color arrays.

11. The underwater video light system of claim 9, wherein the diameter of the light head housing may be increased to accommodate an expanded chip-on-board LED array.

12. The underwater video light system of claim 9, wherein the preset custom colored LED arrays are based on depth and ambient water colors and are preset arrays cover all depths and mimic various water colors at the depths and color temperatures.

13. The underwater video light system of claim 9, wherein each array is tuned and configured to emit an exact water color at a predetermined color temperature.

14. The underwater video light system of claim 9, wherein the chip-on-board LED arrays cover the various water colors and depths with no color mixing.

15. An underwater video light system, comprising: a chip-on-board LED light configured to project multiple-colored LED light arrays in an underwater environment from a chip-on-board LED module; at least one preset colored LED light array is paired with a daylight white chip-on-board, wherein a daylight color, shallow water color, deeper water color are all in one chip-on-board;
    wherein each array is tuned and configured to emit an exact water color at a predetermined color temperature;
    wherein the chip-on-board LED module individual LED chips are tightly packed on a substrate and covered with a single phosphor layer;
    a wide-angle glass cover and alternatively a glass dome cover coupled to the chip-on-board LED light configured to project the chip-on-board LED light in a wide angle illumination in the underwater environment;
    at least one digital processor controller coupled to the chip-on-board LED light configured to regulate power transmission to the chip-on-board LED light module;
    at least one rechargeable battery pack coupled to the chip-on-board LED light, to provide power to the chip-on-board LED module; and
    an LED display coupled to the chip-on-board LED light configured to display operating settings and color selections.

16. The underwater video light system of claim 15, wherein the LED display shows the lumen's power setting in a range between 400 to 45,000+ lumens, burn time remaining, and includes a smaller knob to allow the user to switch between daylight that is 5600k and ambient preset water color arrays.

17. The underwater video light system of claim 15, wherein the diameter of the light head housing may be increased to accommodate an expanded chip-on-board LED array.

18. The underwater video light system of claim 15, wherein the preset custom colored LED arrays are based on depth and ambient water colors and are preset arrays cover all depths and mimic various water colors at the depths and color temperatures.

19. The underwater video light system of claim 15, wherein each array is tuned and configured to emit an exact water color at a predetermined color temperature.

20. The underwater video light system of claim 15, wherein the chip-on-board LED arrays cover the various water colors and depths with no color mixing.

* * * * *